(12) United States Patent
Bader

(10) Patent No.: US 7,392,848 B1
(45) Date of Patent: *Jul. 1, 2008

(54) METHODS TO PRODUCE SULFATE-FREE SALINE WATER AND GYPSUM

(76) Inventor: Mansour S. Bader, P.O. Box 10675, College Station, TX (US) 77842-0675

( * ) Notice: Subject to any disclaimer, the term of this patent is extended or adjusted under 35 U.S.C. 154(b) by 526 days.

This patent is subject to a terminal disclaimer.

(21) Appl. No.: 11/139,881

(22) Filed: May 27, 2005

(51) Int. Cl.
*E21B 43/22* (2006.01)
*B01D 61/36* (2006.01)
*B01D 61/02* (2006.01)
*B01D 61/00* (2006.01)
*E21B 43/00* (2006.01)

(52) U.S. Cl. .................. 166/371; 166/279; 166/300; 166/309; 166/310; 210/650; 210/652; 210/640

(58) Field of Classification Search .................. None
See application file for complete search history.

(56) References Cited

U.S. PATENT DOCUMENTS

| | | | |
|---|---|---|---|
| 4,327,146 A * | 4/1982 | White .................. 428/308.8 |
| 4,347,704 A * | 9/1982 | Marquardt et al. ............ 60/648 |
| 4,366,063 A | 12/1982 | O'Connor |
| 4,476,024 A | 10/1984 | Cheng |
| 4,545,862 A | 10/1985 | Gore et al. |
| 4,781,837 A | 11/1988 | Lefebvre |
| 5,098,566 A | 3/1992 | Lefebvre |
| 5,102,550 A | 4/1992 | Pizzino et al. |
| 5,587,088 A | 12/1996 | Bader |
| 6,365,051 B1 * | 4/2002 | Bader .................. 210/640 |
| 6,663,778 B1 | 12/2003 | Bader |
| 7,093,663 B1 * | 8/2006 | Bader .................. 166/371 |

* cited by examiner

*Primary Examiner*—Krishnan S Menon

(57) ABSTRACT

Methods are disclosed for the selective separation of sulfate from a saline stream such as seawater to produce nearly sulfate-free saline stream for oil-fields water injection operations. The separated sulfate in the form of gypsum from the treated saline stream can be used in different applications.

31 Claims, 9 Drawing Sheets

METHODS TO PRODUCE SULFATE-FREE SALINE WATER AND GYPSUM

BACKGROUND OF THE INVENTION

Seawater injection for flooding and pressure maintenance in oil-fields is taking place on a massive scale throughout the world. In some giant oil-fields, the current capacity of seawater injection is well over a million barrels per day (equivalent of 42 million gallons per day). Operations of this magnitude demand a thorough understanding of the process of seawater injection.

For illustrative purposes, Table 1 presents the concentrations of inorganic species in seawater as well as in samples of oil-fields produced waters from the Arabian Gulf areas. Sulfate concentration in seawater from the Arabian Gulf is about 1,000 mg/L higher than sulfate concentration in typical seawater streams (e.g., North Sea, Gulf of Mexico, etc.). If the injection rate of seawater from the Arabian Gulf is a million barrels per day (which is currently taking place in some oil-fields in that area), then the impacted reservoir daily intake of sulfate is about 572,294 Kg (630 tons), and of extra calcium is about 84,254 Kg (93 tons). Formation waters from the Arabian Gulf oil-fields consistently contain excessive concentrations of calcium (14,000 to 30,000 mg/L) and strontium (500 to 1,100 mg/L) as well as a small concentration of barium. The obvious incompatibility between such formation waters and seawater causes unusual, severe sulfate problems in the forms of sparingly soluble cations.

FIG. 1 depicts possible locations of scale deposits throughout the flow paths of water in oil-gas production facilities. Scale deposits could take place: (1) at the surface water injection facility where incompatible sources of water are mixed prior to injection; (2) in injection wells where the injected water starts to mix with the reservoir formation water; (3) downhole in the reservoir where the injected water displaces reservoir formation water; (4) downhole in the reservoir where the mixed injected water and formation water are about to reach the range of producing wells; (5) downhole in the reservoir where the mixed (injected and formation) waters are within the range of producing wells; (6) at the connection of a branched zone where each branch produces different water; (7) at the manifold of a producing zone where water is produced from different blocks within the same producing zone; (8) at topside facility where produced fluids are mixed from different production zones to separate oil and gas from produced waters, or in pipelines that transport produced fluids to on-shore processing facilities; and (9) at disposal wells where produced water is injected for final disposal.

In oil-fields where seawater is injected, there are two periods that can be distinguished by two main types of scale. The first period is the pre-seawater breakthrough where calcium carbonate scale is predominant due to the loss of carbon dioxide. Sulfate scale in this period is less pronounced. Calcium carbonate scale is not difficult to control by inhibitors or acid dissolvers. The second period is the post-seawater breakthrough where sulfate scale is dominant. Formation of sulfate scale leads to critical operational problems and difficulties, and therefore, substantial capital and operating costs.

In the pre-seawater breakthrough period, some reservoir engineers believe that sulfate scale is not much of a problem. This is attributed, in part, to the fact that in such a period, they may rarely have experienced deposits of sulfate scale. However, sulfate scale deposits start to build up outside the wells, within the oil-bearing formation, where they are invisible. For example, calcium sulfate scale deposit is often difficult to physically detect, or even to predict by scale models in the pre-seawater breakthrough period. Calcium sulfate scale is highly likely to build up within the formation long before it starts depositing precipitates on tubular equipment. When sulfate scale physically starts appearing in a widespread way in tubular equipment, this would indicate that scale build up is very advanced.

Sulfate scale deposits are hard, adherent, almost insoluble in mineral acids or other common solvents, and difficult to remove mechanically. This would cause severe flow restrictions in fluids paths from injection wells to disposal wells (FIG. 1). Scale deposits could also possibly include radium and its isotopes (Naturally Occurring Radioactive Materials or NORM) that tend to co-precipitate with barium or strontium or calcium. Such co-precipitation is attributed to the similarity in ionic radius and coordination among these sparingly soluble alkaline cations. The adherent of NORM to sulfate scale constitutes radioactive hazards. Hydrogen sulfide could also be generated due to the conversion of sulfate in downhole by reducing bacteria. This would lead to reservoir souring, corrosion of both downhole and surface equipment, and possible exposure of workers to a lethal dose of hydrogen sulfide. Treatment of sulfate scale and its associated problems tend to be very expensive, trial-error procedures, field specific, successful only in less severe cases of scaling, and problematic under certain conditions.

However, there is a persistent tendency in oil-gas industries to use available water for injection operations, regardless of the fact that sulfate scale will cause critical problems, and then attempting to remediate such problems that are deliberately allowed to occur. Unfortunately, producers repeatedly fall into the trap of focusing on short-term solutions to their production problems. Production of hydrocarbons under severe conditions such as the continuing injection of seawater without sulfate treatment would doubtlessly create long-term sulfate-related problems.

The only logical effective approach to prevent sulfate scale problems is, unequivocally, the selective removal of sulfate from seawater before injection. This would entirely eliminate the long-term sulfate scale treatment costs (backflow, hydraulic fracturing, acid wash, injection of inhibitors and dissolvers, mechanical reaming, etc.), reduction in productivity index, deferred oil production, and totally prevent the irreversible damages within the invisible oil-bearing formation. New oil-fields seawater injection facilities must include the selective removal of sulfate, and existing facilities that handle only standard seawater pretreatment must be upgraded to include the much-needed sulfate removal treatment.

This patent provides innovative methods to produce nearly sulfate-free seawater for oil-fields water injection operations. That is a proactive, rather than a reactive, approach that could efficiently stimulate producing wells, and economically enhance production in the least damaging manner. Further, the co-production of gypsum as a valuable commodity that can be used in different applications would provide zero or near-zero discharge processing methods.

The innovative methods in this patent are divided into three main processing groups. The first group is based on membrane systems in conjunction with a novel compressed-phase precipitation (CPP) process. The membrane systems in such a group are further divided into pressure-driven membranes (reverse osmosis and nanofiltration), and thermal-driven membranes (membrane distillation and membrane osmotic distillation) in conjunction with the CPP process. The second group is the stand alone CPP process with external seeding mode. The third group is the stand alone CPP process with internal seeding mode.

SUMMARY OF THE INVENTION

In one aspect, the present invention provides a method for separating sulfate from saline water to produce nearly sulfate-free saline stream and gypsum. The inventive method comprises the steps of: (a) removing sulfate from saline water; (b) injecting nearly sulfate-free saline stream into subterranean formation for hydrocarbons recovery; (c) producing gypsum boards or materials from gypsum slurry; or (d) producing potassium sulfate as a potash fertilizer from gypsum slurry. Sulfate is removed from saline water in step (a) by (i) concentrating saline water by a membrane system to produce an intermediate concentrate comprising at least higher concentration of gypsum; (ii) pressurizing the intermediate concentrate into a precipitator at pressure between about 400 psi and about 1200 psi through at least one injection nozzle to produce a jet stream of the intermediate concentrate; (iii) pressurizing an amine solvent or an amine solvent with modifier into the precipitator at pressure between about 400 psi and about the critical pressure of the amine solvent or the amine solvent with modifier through at least one injection nozzle to form micron-size precipitates of gypsum from the intermediate concentrate; (iv) removing the micron-size precipitates from the intermediate concentrate by filtration to produce gypsum slurry; and (iv) removing at least most of the amine solvent or the amine solvent with modifier from the intermediate concentrate by a stripping unit to produce nearly sulfate-free saline stream. Producing gypsum boards or materials from gypsum slurry in step (c) by (i) separating gypsum slurry into moist solid gypsum and liquor stream; (ii) removing at least most of the remaining amine solvent or amine solvent with modifier from liquor stream; (iii) recycling liquor stream to the intermediate concentrate; (iv) molding the moist solid gypsum to produce gypsum boards or gypsum materials; and (v) allowing gypsum boards or gypsum materials to dry. Potassium sulfate is produced from gypsum slurry in step (d) by (i) adding potassium chloride to gypsum slurry to produce an intermediate liquor stream; (ii) adding an amine solvent or an amine solvent with modifier to the intermediate liquor stream to form precipitates comprising potassium sulfate; (iii) removing precipitates from the intermediate liquor stream; (iv) removing at least most of the amine solvent or the amine solvent with modifier from the intermediate liquor stream; and (v) recycling the intermediate liquor stream comprising at least dissolved calcium chloride to the intermediate concentrate.

Saline water is seawater, natural brine water, oil-gas fields produced water, coal-bed produced water, mining operations produced water, flue gas desulphurization produced water, or a combination thereof. The membrane system is reverse osmosis, nanofiltration, membrane distillation, membrane osmotic distillation, or a combination thereof. The injection jet nozzle is coaxial nozzle, spray nozzle, vibrating nozzle, premixed nozzle, or a combination thereof. The amine solvent is selected from the group consisting of isopropylamine, propylamine, dipropylamine, diisopropylamine, ethylamine, diethylamine, methylamine, and dimethylamine. The modifier is nitrogen, nitrous oxide, or a combination thereof in liquid or gaseous state.

In another aspect, the present invention provides a method for separating sulfate from saline water to produce nearly sulfate-free saline stream and gypsum. The inventive method comprises the steps of: (a) concentrating sulfate in saline water to produce an intermediate saline water; (b) removing sulfate from the intermediate saline water; (c) injecting nearly sulfate-free saline stream into subterranean formation for hydrocarbons recovery; (d) producing gypsum boards or materials from gypsum slurry; or (e) producing potassium sulfate as a potash fertilizer from gypsum slurry. Sulfate is concentrated in saline water in step (a) by (i) pressurizing saline water into a precipitator at pressure between about 400 psi and about 1200 psi through at least one nozzle to produce a jet stream of saline water; (ii) pressurizing an amine solvent or an amine solvent with modifier into the precipitator at pressure between about 400 psi and about the critical pressure of the amine solvent or the amine solvent with modifier through at least one nozzle to form at least some micron-size precipitates of gypsum from saline water; (iii) classifying micron-size precipitates into fine and large precipitates; and (iv) recycling the fine micron-size precipitates into a pre-precipitator to mix with saline water to produce an intermediate saline water with higher gypsum concentration. Sulfate is removed from the intermediate saline water in step (b) by (i) pressurizing the intermediate saline water into the precipitator at pressure between about 400 psi and about 1200 psi through at least one nozzle to produce a jet stream of the intermediate saline water; (ii) pressurizing the amine solvent or the amine solvent with modifier into the precipitator at pressure between about 400 psi and about the critical pressure of the amine solvent or the amine solvent with modifier through at least one nozzle to form large micron-size precipitates of gypsum from the intermediate saline water; (iii) removing the large micron-size precipitates from the intermediate saline water by filtration to produce gypsum slurry; and (iv), removing at least most of the amine solvent or the amine solvent with modifier from the intermediate saline water by a stripping unit to produce nearly sulfate-free saline stream.

In yet another aspect, the present invention provides a method for separating sulfate from saline water to produce nearly sulfate-free saline stream and gypsum. The inventive method comprises the steps of: (a) removing sulfate from saline water; (b) injecting nearly sulfate-free saline stream into subterranean formation for hydrocarbons recovery; (c) producing gypsum boards or materials from gypsum slurry; or (d) producing potassium sulfate as a potash fertilizer from gypsum slurry. Sulfate is removed from saline water in step (a) by (i) pressurizing saline water into a precipitator at pressure between about 400 psi and about 1200 psi through at least one nozzle to produce a jet stream of saline water; (ii) pressurizing an amine solvent or an amine solvent with modifier into the precipitator at pressure between about 400 psi and about the critical pressure of the amine solvent or the amine solvent with modifier through at least one nozzle to form at least some micron-size precipitates of gypsum from the saline water; (iii) classifying micron-size precipitates into fine and large precipitates; (iv) recycling the fine micron-size precipitates of gypsum into the precipitator at pressure between about 400 psi and about 1200 psi through at least one nozzle to produce large micron-size precipitates of gypsum from saline water; (v) removing the large micron-size precipitates from saline water by filtration to produce gypsum slurry; and (vi) removing at least most of the amine solvent or the amine solvent with modifier from saline water by a stripping unit to produce nearly sulfate-free saline stream.

This invention is of particular interest in connection with applications such as, but not limited to, oil and gas, mining, geothermal power plants, flue gas desulphurization, gypsum production, coal or oil fired power plants, industrial boilers, cooling towers, saline water desalination plants, treatment of contaminated water sources such as surface or ground water by natural brine or oil-gas fields brine or brine resulting from all kinds of mining operations (sparingly soluble inorganics, toxic metals, lanthanides, actinides, etc.), treatment of natural brine or oil-gas fields brine or brine resulting from all kinds of mining operations to prevent contaminating water sources such as surface or ground water, and other similar operations.

This invention is not restricted to use in connection with one particular application. This invention can be used, in general, for the selective removal of inorganic from aqueous streams with precipitates ranging from macro- to submicron-sizes. Further objects and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

Figure 1:
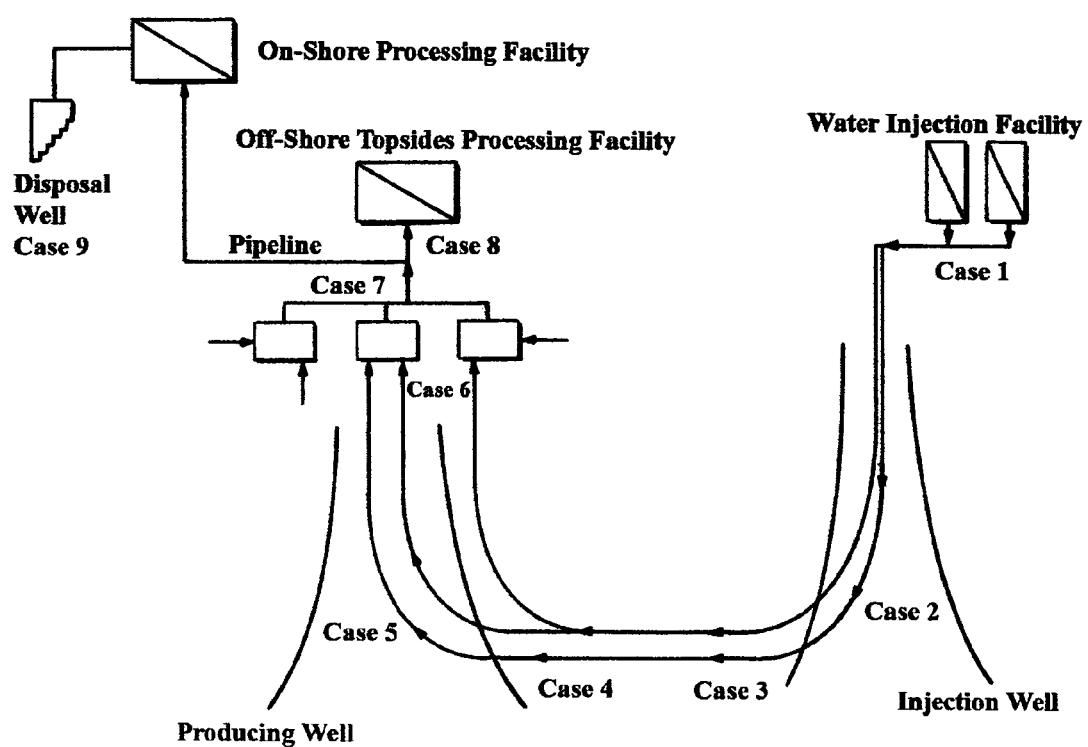
FIG. 1 illustrates possible locations for scale deposits.

Reverse osmosis (RO) systems are increasingly used in arid areas to provide fresh water. In arid areas such as the Arabian Gulf, for instance, the maximum throughput ratio of RO systems is about 30%. That is 30% fresh water and 70% concentrate stream of seawater. The predicted ion concentrations from the Arabian Gulf in the RO concentrate stream are given in Table 1. Such a stream is concentrated by a factor of 1.4, depleted of oxygen, and with a significant sheer volume (about 67% of the feed stream). The disposal of the RO concentrate stream could thus cause major technical, economical, and ecological problems.

The ongoing practice of discharging RO concentrate stream into the sea would increase the salinity around the RO intake, particularly when the dispersion of such a stream is not fast enough (e.g., not enough natural current at the disposal site, relatively shallow water, and absence of mechanical dispersion devices). In addition, the lack of oxygen in such a stream would adversely affect the marine environment. Further, the near induction precipitation of gypsum in such a stream would create a cloud of turbid precipitates (due to salinity differences between seawater and RO concentrate stream) that could poison the marine habitat.

However, the high salinity disadvantage of the RO concentrate stream is a benefit in oil-fields water injection operations due to the high salinity of most formation waters. This would make such a stream more compatible with formation waters in terms of salinity. If such a stream is depleted of sulfate, then it would be ideal for oil-fields water injection operations. Several advantages of utilizing, rather than disposing of, the RO concentrate stream can be seen.

First, the RO concentrate stream is depleted of suspended matters, bacteria, oxygen, and more importantly alkaline scale (bicarbonate-carbonate). All of such annoying parameters are controlled in the pretreatment stage of the RO feed stream. Therefore, such a stream is readily processable.

Second, once sulfate is selectively separated from the RO concentrate stream by this invention, then gypsum, for instance, as a commercial bulk commodity, can be co-produced. This would provide full process utilization with zero or near zero discharge waste streams.

Third, countries in arid areas have refrained from using RO systems due to high operating costs and low output. Thus, they tend to focus on thermal-driven technologies rather than RO systems for dual production of fresh water and electricity. This invention allows effective dual uses of RO systems, that are freshwater for human uses and concentrate stream of seawater (to be depleted of sulfate) for oil-fields water injection operations. This would resolve the problems that are associated with discharging a large volume of the RO concentrate stream back into the sea.

Fourth, most RO installations exist in coastal or near coastal areas, and therefore their accessibility to on-shore oil fields and some offshore can be utilized. This would provide an economic incentive for new RO installations or for upgrading existing facilities. Plans for future RO installations should thus consider locations to fulfill the need, if any, for oil-fields water injection operations.

Fifth, the typical pressure of the RO feed stream is between 1,000 and 1,200 psi. In pressure-driven membranes such as RO (and NF), the permeate stream is produced at near atmospheric pressure while the concentrate stream is produced at approximately 20 to 50 psi below the feed stream pressure. Thus, the pressure of the RO concentrate stream is roughly between 950 and 1,150 psi. Such a valuable energy input within the RO concentrate stream can be recovered and used innovatively.

This invention is focused on utilizing the energy input within the RO concentrate stream, to selectively separate sulfate from the bulk of such a stream using an innovative compressed-phase precipitation (CPP) process. This would make RO systems technically, economically, and ecologically more attractive.

I have previously invented a liquid-phase precipitation (LPP) method for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as the ionic charge, ionic radius, and the presence of a suitable anion in an inorganic-aqueous solution and its effect on the pH rate of change play an important role in affecting and characterizing the formation of precipitates.

The second criteria is suitability for overall process design. For ease of recovery, the selected organic solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. The solvent vapors are also of prime health and environmental concerns. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks (e.g., IPA salts have been used as a herbicide for agricultural purposes).

There is always an interest in improving the performance of the LPP. Such improvements can be seen in two areas. The first improvement is to reach saturation faster, particularly for inorganic species with an intermediate aqueous solubility limit (more than sparingly soluble species). This would minimize the use of the amine solvent, and reduce the size of processing equipment. The second improvement is to produce controllable precipitates that are more uniformly distributed with high yield, and preferably in micron or submicron sizes. This inventive CPP process has the potential to achieve such improvements.

In concept, the CPP is similar to the LPP. That is the targeted inorganic species must be nearly insoluble in the amine solvent, whereas the mother solvent (water), in which the inorganic species is dissolved, is miscible with the amine solvent. However, the difference is that the amine solvent in the CPP is subject to pressure and/or temperature manipulations, and thus the amine solvent exhibits unusual thermophysical properties such as liquid-like density, higher diffusivity, higher compressibility, and lower viscosity.

The fast diffusion combined with low viscosity of the compressed amine solvent into the inorganic-aqueous phase produces faster supersaturation of the inorganic species and its possible precipitation in the desired micron size. Thus, the particle-size as well as the particle-size distribution, morphology, and crystal structure can be controlled. The achievement of faster supersaturation degree would, in turn, minimize the use of the amine solvent, maximize the recovery of the amine solvent, and maximize the removal of the targeted inorganic species.

Several related factors could influence the performance of the CPP process. These factors are: (1) the initial concentration and the mass flow rate of the targeted inorganic species in the saline stream; (2) the injection methods of both the saline stream and the amine solvent into the precipitator unit; and (3) the pressures and temperatures of both the saline stream and the amine solvent. Following is a discussion of these factors.

Targeted Inorganic Species

The main targeted species is sulfate in the form of calcium (gypsum or calcium sulfate dihydrate). Gypsum should nearly completely be separated from the RO concentrate stream to meet the first objective of the process in providing a nearly sulfate-free stream for oil-fields water injection operations. Gypsum precipitates should also preferably form uniform micron-size precipitates to meet the second objective of the process in effectively dewatering and utilizing gypsum as a viable raw material for other applications. For instance, the quality of dewatering the precipitated gypsum is directly affected by the uniformity and size distribution of gypsum precipitates. Good dewatering will reduce the free moisture of the gypsum cake, an important factor in manufacturing gypsum wallboards, for example. In addition to a small amount of sodium chloride, however, there are other sparingly soluble inorganic species that could co-precipitate with gypsum. Such species include strontium sulfate (celestite), and magnesium hydroxide (brucite).

In the design of pressure-driven membranes (RO and NF) for seawater treatment, formation and quantification of celestite scale are always neglected. However, the fast precipitation of celestite could act as a seeding agent in initiating and speeding gypsum precipitation. This is attributed to the low aqueous solubility limit of celestite (about an order of magnitude lower than the gypsum aqueous solubility limit).

The saturation degree (S) can be expressed as follows:

$$S = \frac{[M^{+z}][X^{-z}]}{K_{SP}} \quad (1)$$

where $M^{+z}$ and $X^{-z}$ are, respectively, the molal concentrations (mol/kg) of the cation and anion in a given stream, and $K_{SP}$ is the solubility product constants. The $K_{SP}$ value for gypsum based on the given RO concentrate stream (Table 1) is predicted from Marshall and Slusher (1968), "Aqueous Systems at High Temperature: Solubility to 200C of Calcium Sulfate and its Hydrates in Seawater and Saline Water Concentrates, and Temperature-Concentration Limits", J. Chem. Eng. Data 13: 83-93. The $K_{SP}$ value for celestite is predicted from Jacques and Bourland (1983), "A Study of Solubility of Strontium Sulfate", Soc. Pet. Eng. J. April: 292-300. The estimated saturation degrees (S) of the targeted gypsum and celestite in the RO concentrate stream are, respectively, 0.5 and 0.8. This indicates that gypsum is below saturation while celestite is near saturation.

Figure 2:
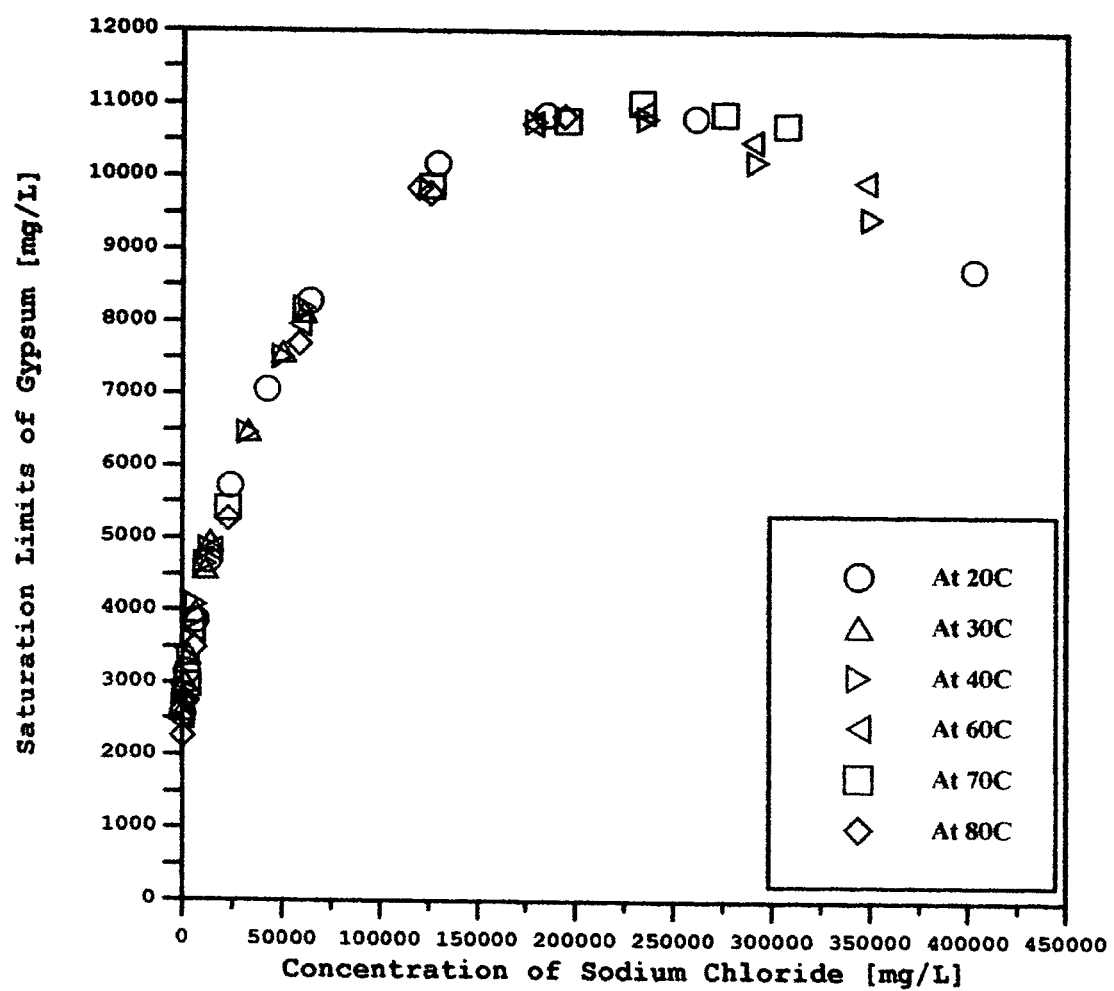
FIG. 2 illustrates gypsum solubility limits vs. sodium chloride concentrations.

FIG. 2 shows the relation between the concentrations of sodium chloride and the solubility limits of gypsum as a function of temperature at atmospheric pressure. The solubility limits of gypsum increase with increasing sodium chloride concentration, reach a maximum, and then decline at very high concentrations of sodium chloride. Three issues about the aqueous solubility limit concept for sparingly soluble inorganic species must be highlighted.

First, the reported solubility limits data for gypsum (as well as celestite) could be over estimated due to the delayed formation of precipitates (induction period and transformation from saturation to supersaturation). Therefore, the predicted values of $K_{SP}$ from such solubility limits data tend to be higher than the actual values. This, in turn, would lead to a lowering of the estimated value of the saturation degree.

Second, the solubility limit is fundamentally true only when the solution is stoichiometrically balanced. That is, for instance, when the number of calcium ions equals the number of sulfate ions in a given concentration of sodium chloride. If an excess of either ion (anion or cation) is introduced, the solubility will be depressed significantly. The concentration of sulfate in the RO concentrate stream (Table 1) is about six-fold the concentration of calcium.

Third, the aqueous solubility limits measurements of gypsum and celestite were at atmospheric pressure. My model prediction indicated that higher pressures depress the aqueous solubility limits of gypsum. Therefore, the increase of gypsum solubility limits in seawater over that in pure water is true for low pressures only. The higher the pressure becomes, the smaller the difference between the dissolving capacity of sodium chloride (dominant salt in seawater) and de-ionized water.

The co-existence of celestite combines with the high pressure, and the significant stoichiometric imbalance between sulfate and calcium in the RO concentrate stream indicate the existence of higher gypsum saturation degree than the predicted one.

Brucite as a sparingly soluble species could also co-precipitate with gypsum and celestite. This can be attributed to the possible presence of an excess of hydroxide ions from using an amine solvent as a precipitation agent. If a portion of the magnesium ion is tied up as brucite precipitates, this would cause more gypsum to precipitate in a fast way. However, the selected amine solvents for the CPP process are weak bases, which do not furnish the hydroxide ion directly by dissociation. In addition, the volume of a selected amine solvent in the CPP is expected to be low compared to the volume of the RO concentrate stream. Thus, the pH of the mixed stream (the amine solvent and the RO concentrate stream) is the key to allow significant or insignificant precipitation of brucite.

Injection Methods

Various commercial jet injection devices such as coaxial injection nozzles, spray injection nozzles, vibrating injection orifices or nozzles, premixed injection nozzles, and others can be used in applying the CPP process. Although the effectiveness of the CPP process lies mainly in the ability of the amine solvents as a function of manipulating pressure, temperature, and other operating variables, the efficiency of the injection device (contact between the amine solvent and saline water) is also important. If the nucleation (precipitate formation) and condensation (precipitate growth) mechanisms are fast enough, then precipitates will reach a high degree of supersaturation in a very short period of time and within the precipitator unit. This would allow appreciable reduction in the size of the precipitator unit. A significantly high degree of supersaturation, however, leads to smaller precipitates.

A possible jet injection method that can be used in the CPP process is a concentric nozzle. In such a nozzle, the RO concentrate stream flows through the inner tube while the amine solvent flows through the coaxial annulus. Therefore, the main mechanism of the jet hydrodynamic mixing is that the jet stream (RO concentrate) draws in compressed amine fluid from the surrounding mass of such a fluid. The smaller the nozzle diameters, the higher the inlet velocities of the compressed fluids, which will result in a more efficient micromixing. The highest nucleation of precipitates will take place at the border of the jet stream (region of contact). However, the highest condensation of precipitates will take place at the center of the jet stream due to the high turbulence impact and higher solute concentration in the center of the jet.

Another possible injection method that can be applied in the CPP process is that the compressed amine and the RO concentrate stream are injected into the precipitator unit via two separate spray nozzles. If the velocities of the injected fluids are not equal, then fast and/or a significantly high degree of supersaturation may not be achieved. Therefore, the induction and condensation periods for precipitates will be longer. This could affect the design of the precipitator unit (the need for a larger instead of a smaller precipitator unit, further mixing devices such as a stirred precipitator unit, precipitates seeding step, etc.). However, a moderate degree of supersaturation leads to larger precipitates.

Effect of Pressure and Temperature

Table 2 reveals that the selected amine solvents have relatively low critical pressures, and moderate critical temperatures. As the carbon number of the selected amine solvents increases, critical pressures decrease while critical temperatures (as well as boiling temperatures) increase. The pressure of the RO concentrate stream would typically range between 950 and 1,150 psi. One of the economical approaches is to conduct the CPP process within the critical pressure of the selected amine solvent. The critical pressures of the selected amine solvents vary between about 440 psi (DPA) and 1,090 psi (MA), which are within the maximum pressure limit of the RO concentrate stream.

The critical temperatures of the selected amine solvents lie within the desired intermediate thermal region (400-600 K), a thermal region that permits the stabilization of the kinetic phase rather than the thermodynamic phase. In applications such as the synthesis of inorganic precipitates (e.g., thin-porous and thin-dense ceramic membranes for gas or liquid streams, high-temperature superconductors (HTS), solid acids fuel cells, thin-film solar cells, new compounds, pharmaceutical products, etc.), this advantage combined with the very low viscosities of compressed amine solvents could make such solvents highly suitable media for precipitating inorganic species in sub-micron sizes.

The temperature of the RO concentrate stream is about ambient. Hence, it is economically preferable to operate the CPP process at about ambient temperature to treat the RO concentrate stream for the selective removal of sulfate. This can be achieved by either using a compressed amine solvent at subcritical temperature, or by matching the compressed amine solvent with an appropriate modifier to achieve mainly a lower critical temperature while maintaining the polarity, basicity, miscibility, and precipitating ability of the compressed amine in inorganic-aqueous streams.

Molecules containing a hydrogen atom bonded to nitrogen, or oxygen, or fluorine form a strong dipole-dipole interaction and hydrogen bonding. Primary amines such as, for instance, IPA undergo hydrogen bonding. Thus, such amines are polar solvents and completely miscible in water. However, they are less polar than alcohols. This stems from the fact that the N—HN hydrogen bond between amine molecules is weaker than the O—HO hydrogen bond because nitrogen is less electronegative than oxygen, which results in low boiling points of primary amines.

Nitrogen ($N_2$) can form compounds with only three covalent bonds to other atoms. A molecule of amine contains $sp^3$-hybridized nitrogen atom bonded to one or more carbon atoms. The nitrogen has one orbital filled with a pair of unshared valence electrons, which allows these compounds to act as bases. Amines are therefore weak bases that could undergo reversible reactions with water or other weak acids. However, when an amine reacts with a strong acid, the unshared electrons of the amine are used to form sigma bond with the acid, which drives the reaction to completion (irreversibly) to produce an amine salt.

$CO_2$ as a modifier in the sense of forming homogeneous single phase with the compressed primary amine solvent is apparently a mismatch. This is attributed to the reactivity of primary amines with the acidic compressed $CO_2$ to form carbamates, or split phases with variable solubility. However, the interaction of compressed $CO_2$ with water also leads to significantly reduce the pH of the solution (e.g., 2.8) resulting in the formation of carbonic acid. The reactivity and acidity of $CO_2$ in aqueous solution, and the non-homogeneity of $CO_2$ with primary amines can be advantageous in applications such as the removal of Naturally Occurring Radioactive Materials (NORM), transition metals, and scale salts from oil-fields formation waters, geothermal brine waters, coal-mining waters, and the like.

Nitrous oxide ($N_2O$) or $N_2$ can be possible modifiers for the selected amine solvents. Unlike $CO_2$, both are miscible in amine solvents, and not acidic. $N_2O$ is a nontoxic low polarity fluid with almost similar critical properties as $CO_2$ except it has a permanent dipole moment. However, both $N_2O$ and $CO_2$ exhibit partial aqueous miscibility.

$N_2$ is an inert species with a very low critical temperature (126.2 K), and a moderate critical pressure (33.4 atm) that is close to the critical pressures of the selected amine solvents. This could potentially provide a critical temperature for a mixture of $N_2$ (as a gas or as a liquid) and a selected amine solvent that lies proximate to ambient temperature. Air can be used as a free source for gaseous $N_2$. However, $N_2$ is sparingly miscible in water.

Since $N_2$ and $N_2O$ are sparingly miscible in water, the chosen modifier must be premixed and completely homogenized with the amine solvent before injection into the targeted inorganic-aqueous stream. As such, the proportion of $N_2$ or $N_2O$ to the amine solvent ought to be carefully optimized to prevent any negative effects on the desired properties of the amine solvent in water.

The RO-CPP Process

Figure 3:
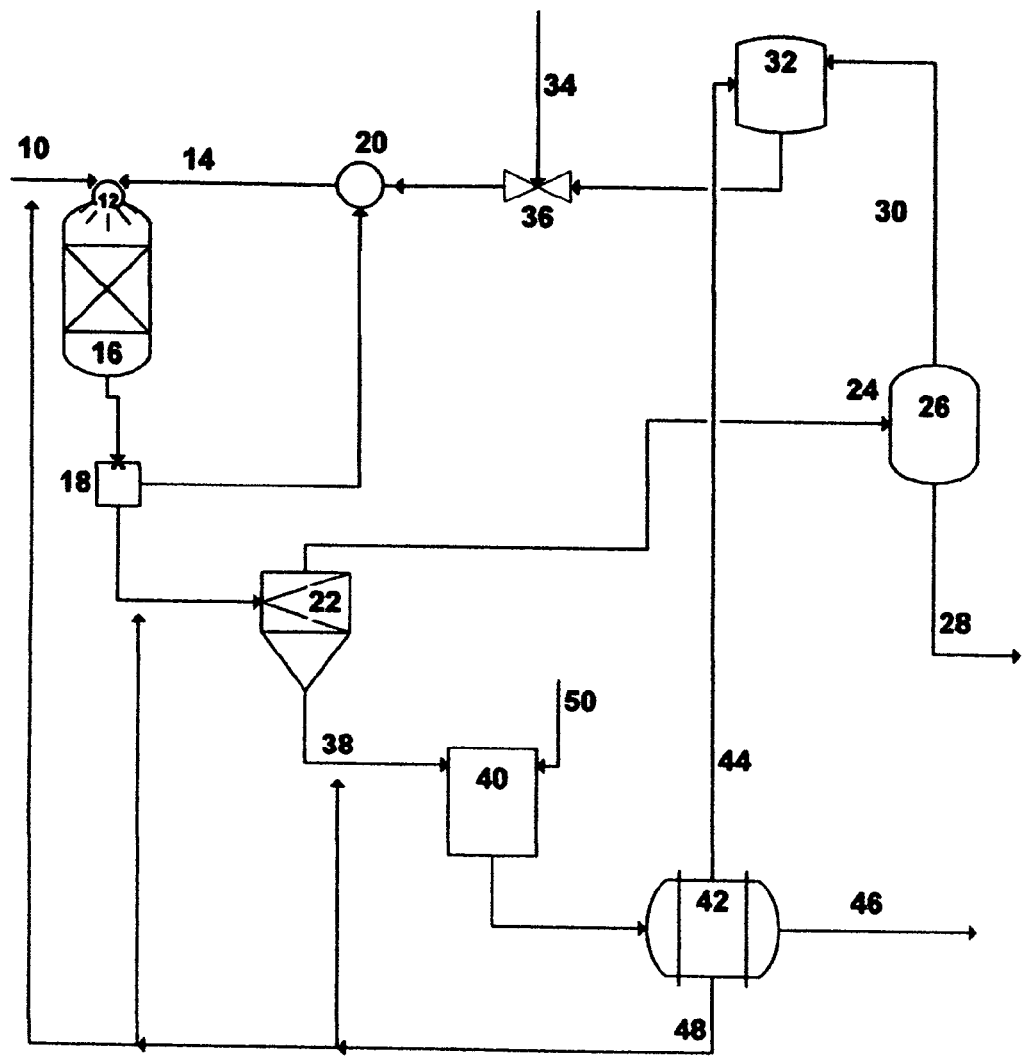
FIG. 3 illustrates a possible flow diagram for the RO-CPP process.

Reference is now made to FIG. 3, which depicts a simplified possible flow diagram illustrating the treatment of the RO concentrate stream by a single-stage CPP process. Multiple stages of precipitator units instead of a single-stage precipitator unit can also be implemented. A possible approach for pressurizing the RO concentrate stream and the amine solvent into the precipitator unit is to use a concentric nozzle where the RO concentrate stream is pressured through the inner tube of nozzle while the amine solvent is pressured through coaxial annulus of the same nozzle. Multiple concentric nozzles can be installed within a single precipitator unit. It should be pointed out that the compressed amine solvent and the RO concentrate stream can also be injected into the precipitator unit via two separate spray nozzles.

As shown in FIG. 3, seawater RO concentrate stream [10] will be delivered to the precipitator unit [16] preferably via the inner tube of at least one concentric nozzle [12]. The pressure of such a stream is between about 400 and 1,200 psi. A selected amine solvent will be delivered [14] into the precipitator unit [16] at a pressure ranging between about 400 psi and the critical pressure of the amine solvent through the coaxial annulus of the same concentric nozzle. The outlet stream from the precipitator unit [16] will be fed into either a low-pressure thickener-stage of hydrocyclones, or a high-pressure thickener-stage of hydrocyclones to separate the formed precipitates (mainly gypsum) from the stream.

The hydraulic energy within the outlet stream of the precipitator unit [16] is a perfect target for energy recovery. A suitable energy recovery device either based on positive displacement or centrifugal principles (depending on its energy transfer efficiency) can be used to convert the hydraulic energy into mechanical energy for reuse. The efficiency of the selected energy device, the operating pressure of the stream that the hydraulic energy will be extracted from, and the required flow rate for the stream that the converted mechanical energy will be delivered to, determine the economic value of the energy recovery approach.

In the case of using a low-pressure thickener-stage of hydrocyclones, the energy recovery device [18] can be installed between the precipitator unit [16] and the low-pressure stage of the hydrocyclones [22]. This would allow: (1) the use of low-pressure instead of high-pressure hydrocyclones; and (2) better energy recovery since significant pressure drop through the stage of hydrocyclones is avoided.

Such an arrangement is fundamentally possible because the amine solvent and seawater are miscible at atmospheric pressure. The depressurization of the high-pressure outlet stream from the precipitator unit [16] should thus not affect their mutual miscibility that has a direct effect on precipitates quality (e.g., re-dissolving of precipitates). The converted hydraulic energy into mechanical energy by the energy recovery device [18] should be sufficient to pressurize the amine solvent [20] (and its modifier) into the precipitator unit [16] without the possible need for a high pressure pump.

Alternatively, the energy recovery device can be installed after the high-pressure thickener-stage of the hydrocyclones on the line of the over flow stream of the hydrocyclones [24] (not shown in FIG. 3). Such an arrangement might be useful, for instance, if the design of hydrocyclones requires a 10 micron cut point. With such a cut point, the pressure drop is expected to fall within the 60 to 100 psi range across the thickener-stage of hydrocyclones.

As shown in FIG. 3, the de-pressurized over flow stream [24] of the low-pressure hydrocyclones [22] that contains the nearly sulfate-free seawater and the amine solvent will be fed into a vapor-liquid equilibrium based stripping unit [26] to separate the nearly sulfate-free seawater [28] from the amine solvent [30]. The stripping unit could be a flash drum, a vacuum or a standard distillation tower, a vacuum membrane distillation unit, or a pervaporation unit. The recovered amine solvent will be recycled to the solvent storage tank [32]. The nearly sulfate-free seawater [28] will be used in oil-fields water injection operations.

The amine solvent can also be mixed with $N_2$ or $N_2O$ [34] in a mixer [36] to mainly reduce the critical temperature of the amine solvent. $N_2$ is the preferred modifier for the amine solvent due to its low critical temperature and pressure. In addition, air can be used as a source for gaseous $N_2$. Liquid $N_2$ can also be employed to modify the critical temperature of the selected amine solvent. In the case of modifying an amine solvent, the miscible binary mixture of the selected amine solvent and its modifier ($N_2$ or $N_2O$) [14] instead of a pure amine solvent will be pressurized into the precipitator unit [16] via the coaxial annulus of the concentric nozzle [12] to contact the RO concentrate stream [10] that will be pressurized separately via the inner tube of the same concentric nozzle [12].

Gypsum precipitates in the hydrocyclones under flow [38] will be transferred into a thickener tank [40] to further thicken gypsum precipitates ahead of the final gypsum filter [42]. In addition to thicken gypsum precipitates, the thickener tank [40] can also be used to provide a buffer storage capacity, and/or to allow the recovery of any remaining amine solvent from the hydrocyclones under flow stream [38]. The gypsum slurry from the thickener tank [40] will be dewatered by a vacuum filter [42] (final filter). The preference of using a vacuum filter instead of a press filter or a centrifugal filter, is also to recover any remaining amine solvent [44].

The dewatered gypsum [46] can then be poured into a mold (not shown in FIG. 3) to gain full strength. Mold shapes can vary depending on the configuration of the desired final gypsum products (wallboards or as raw materials for other applications). For instance, the gypsum molding step can be selected from a host of geometrical shapes such as rectangular, planar, spherical, cylindrical, conical, trapezoidal, cuboid, and the like. The aqueous liquor stream [48] from the final gypsum filter [42] will be recycled either to the RO concentrate stream [10], or to the feed stream of the hydrocyclones thickener-stage [22], or to the feed stream of the thickener tank [40].

The thickener tank [40] can also be designed as a low- or as a high-pressure precipitator to react gypsum slurry with potassium chloride [50] in the presence of an amine solvent to precipitate potassium sulfate as follows:

$$CaSO_4 2H_2O + 2KCl \Leftrightarrow K_2SO_4 + CaCl_2 + 2H_2O \qquad (2)$$

The precipitated potassium sulfate from this overall basic reaction (Eq. 2) will be dewatered by a vacuum filter [42], and the recovered amine solvent [44] will be recycled into the amine solvent storage tank [32]. The produced potassium sulfate [46] can be used as a potash fertilizer for crops that are sensitive to chloride. In arid areas where farmers use brackish water for irrigation, potash fertilizer would be ideal for improving soil quality and crop yields by combating the effect of sodium chloride. The aqueous liquor stream [48] from the final potassium sulfate filter [42] that contains the dissolved calcium chloride (Eq. 2) can preferably be recycled to the RO concentrate stream [10] to enhance calcium concentration (further increase the saturation degree of gypsum before entering the precipitator unit [16]), rather than recycled to the feed stream of the hydrocyclones stage [22], or to the feed stream of the thickener tank [40].

The Integration of Nanofiltration (NF) with the CPP Process

The engineering practice in pressure-driven membranes such NF is to employ a dual-stage design. Each stage is typically conducted at a 50% throughput ratio. The overall throughput ratio of both stages is 75%. Depending on the required amount of the permeate stream and the allowable space on the NF skid frame (e.g., tight space on offshore platforms), the design can be implemented in a 2:1 array. The purposes of such a design are to: (1) recover waste energy from the concentrate stream; and (2) presumably minimize sulfate scale build-up at the membrane surface and on the concentrate side of the membrane.

Figure 4:
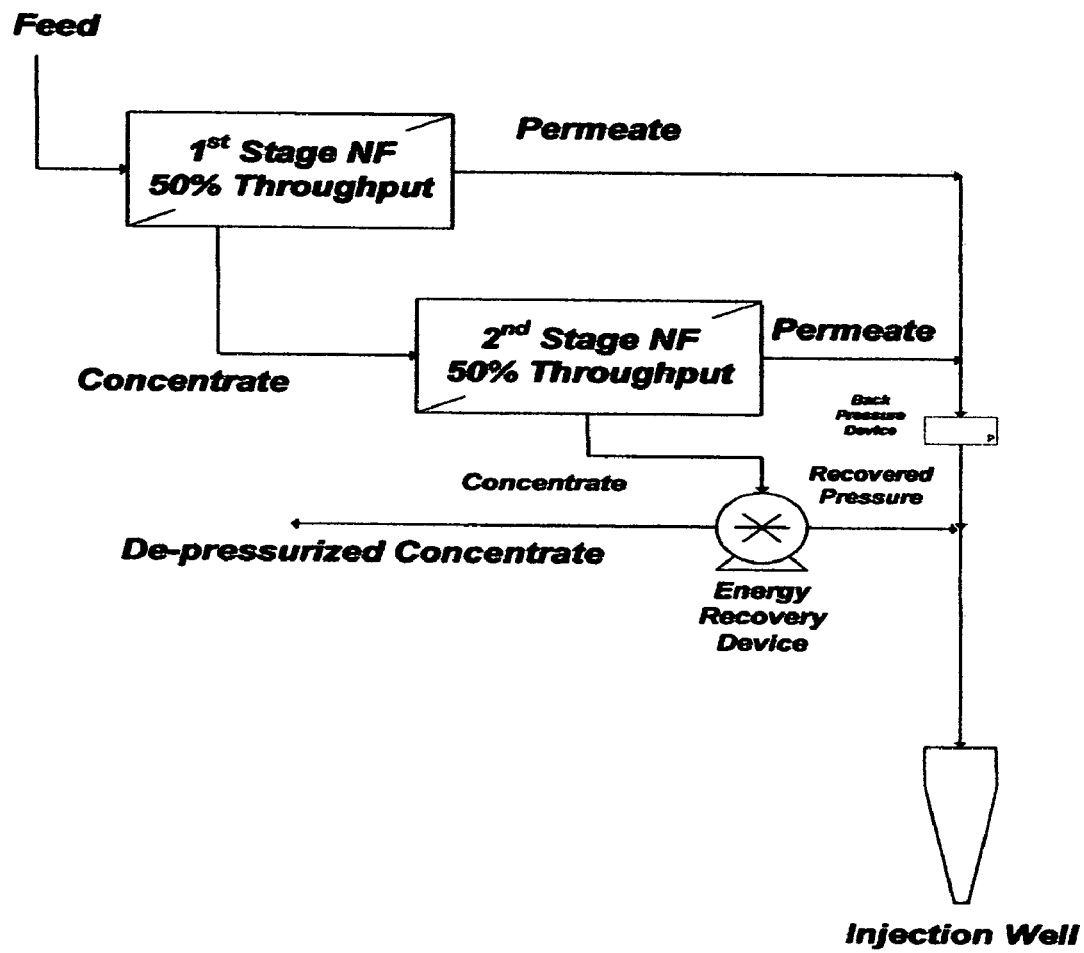
FIG. 4 illustrates a simple flow diagram for a dual-stage NF with energy recovery.

It should be pointed out that energy recovery in NF systems can be further optimized by employing waste energy from the second-stage concentrate stream. This issue was neglected in designing NF systems. Unlike RO systems, where an ambient pressure break tank installs on the permeate side of the membrane, the NF permeate stream will be used in oil-fields water injection operations. As such, a suitable energy recovery device can be installed as shown in FIG. 4 to convert the hydraulic energy of the second-stage concentrate stream into mechanical energy for raising the pressure of the permeate stream. This could minimize the operating cost of high-pressure booster pumps to deliver the permeate stream to oil-fields injection facilities. However, a back pressure device must be installed on the permeate side to protect the membrane from reverse flow.

Three operational difficulties will rise from using the NF concentrate stream from first-stage as a feed stream in the second-stage. First, the higher ion concentrations in the feed of the second-stage (concentrate stream of the first-stage) would lower ion rejection ($R_O$) compared to the first-stage. Second, the permeate flow rate ($Q_P$) in the second-stage is about 50% less than the $Q_P$ in the first-stage. Third, the feed pressure ($\Delta P$) in the second-stage is lower by about 20 to 50 psi than the $\Delta P$ in the first-stage. This means that the influence of concentration polarization in the second-stage is more pronounced on operating parameters than in the first-stage at the same throughput ratio.

There is a considerable difference in sulfate and chloride concentrations between seawater from the Arabian Gulf and typical seawater from different geographical locations (e.g., North sea, Gulf of Mexico, etc.). Although the relative abundance of the major constituents (e.g., sulfate to chloride ratio) is about the same, the variation in sulfate and chloride concentrations is significant in choosing the treatment method. The higher sulfate and chloride concentrations in the Arabian Gulf would, respectively, lead to a higher sulfate scale tendency and higher osmotic pressures. This means higher operating costs in terms of scale inhibitors to inhibit mainly sulfate scale, and a higher power consumption to provide high operating pressure (to exceed seawater natural osmotic pressures).

I have simulated the application of NF as a stand-alone process to treat seawater from the Arabian Gulf using a dual-stage design as depicted in FIG. 4. Each NF stage was simulated at 50% throughput ratio to provide a 75% overall throughput ratio. The predicted operating parameters such as the actual rejection ($R_a$) in the absence of concentration polarization, observed rejection ($R_O$), permeate concentration ($C_P$), concentrate concentration ($C_C$), and concentration at the membrane surface ($C_m$) are presented in Table 3.

The types of scale that could take place at the membrane surface, and on the concentrate side of NF in treating seawater are alkaline and sulfate. The chemistry of alkaline scale (carbonic acid, and bicarbonate and carbonate ions) is pH-dependent. The pH values in the NF feed, permeate, and concentrate streams are typically in the range of 7.3 to 7.7. Thus, the alkalinity of such NF streams is almost entirely in the form of bicarbonate. Alkaline scale can be eliminated by the addition of small amounts of any acidic substance that is soluble in water and stronger than carbonic acid (e.g., sulfuric acid). Once seawater is sufficiently acidified, bicarbonate will be converted to carbon dioxide, and carbon dioxide will be stripped off in a stripping tower.

In NF systems, sodium hypochlorite is used to destroy bacteria contents present in seawater feed stream. Then, sodium bisulfite is dosed in an optimum amount to scavenge oxygen as well as to remove chlorine that could oxidize the membrane. Once sodium bisulfite absorbs a sufficient amount of oxygen, it could be converted to sodium bisulfate, a salt forming acidic substance, that could in turn be used to control alkaline scale. The removal of alkaline scale by acid treatment, however, could slightly increase sulfate concentration in the pretreated feed stream.

In contrast, sulfate scale in the forms of sparingly soluble alkaline cations (e.g., calcium, strontium, and barium) takes place as a result of a physical process that occurs when the solubility limits of such compounds are exceeded. Unlike alkaline scale, gypsum and celestite are not readily eliminated. As such, knowledge of their concentrations at the membrane surface, and on the concentrate side of the membrane is essential to establish the extent of NF throughput ratio that may be achieved before saturation occurs.

Assuming the small amount of alkaline scale (e.g., 2.3 meq./L of bicarbonate in the NF feed stream) can be eliminated by acid pretreatment, the saturation degrees (S) for gypsum and celestite at the membrane surface and on the concentrate side of the membrane were determined for a dual-stage NF system. The high sulfate concentration combines with higher concentrations of calcium and strontium in seawater from the Arabian Gulf than typical seawater streams magnify the amount of sulfate scale deposits. The excessive amount of sulfate would remarkably depress the solubility of gypsum and celestite at the NF membrane surface and on the concentrate side of the membrane due to the common ion effect.

Table 3 reveals that gypsum and celestite are supersaturated in the first-stage (50% throughput) at the membrane surface. In the first-stage concentrate stream, celestite was saturated while gypsum was slightly below saturation. In the second-stage, gypsum and celestite were supersaturated both at the membrane surface and on the concentrate side of the membrane. This means that NF must be operated at a lower overall throughput ratio and with excessive use of scale dissolvers and inhibitors for the treatment of seawater from the Arabian Gulf.

The water flux in the permeate stream of a pressure-driven membrane process such as NF (or RO) is given as follows (Lonsdale, H. K., et al., "Transport Properties of Cellulose Acetate Osmotic Membranes", J. Appl. Poly. Sci., (1965) 9: 1341-1362):

$$J_w = K_w[\Delta P - \sigma \Delta \Pi] \quad (3)$$

where $K_w$ is the water permeability coefficient through the membrane, $\Delta P$ is the applied pressure difference across the membrane, $\Delta \Pi$ is the osmotic pressure difference between the membrane surface ($\Pi_m$) rather than the bulk of the feed stream ($\Pi_F$) and the permeate stream ($\Pi_P$), and $\sigma$ is the reflection coefficient. The reflection coefficient represents the actual rejection ($R_a$) in the absence of concentration polarization by the membrane. In RO membranes, $R_O$ is about 98% for most ions, and thus $\sigma$ can be assumed equal to unity. In NF membranes, however, $R_O$ is significantly less than 98% for most ions, particularly monovalent ions. As such, $R_a$ ($\sigma$) is a critical factor to accurately predict $\Delta \Pi$ in NF systems.

Sodium chloride is by far the predominant salt of seawater. Chlorinity (the total amount of chloride) is about 87% of the total anions in seawater. As such, the osmotic pressure of seawater is typically approximated by the concentrations of sodium chloride. Such an approximation seems to be valid for NF since both sodium and chloride ions diffuse together through the NF membrane to maintain electroneutrality (for every removed anion, one cation must be removed). Further, the rejection of sodium chloride by NF is very low, and decreases as the throughput ratio increases.

As shown in Table 3, the concentration of sodium chloride in the feed stream is about 77% of the total ions, and in the permeate stream is about 87% of the total ions. However, the concentration of sodium chloride at the membrane surface significantly decreases as the throughput ratio increases (e.g., 62% of the total ions at the NF first-stage, and 59% of the total ions at the NF second-stage). To accurately estimate the values of osmotic pressures at the membrane surface ($\Pi_m$), and on the permeate side of the membrane ($\Pi_P$), all ions species must therefore be considered rather than approximated by the concentration of sodium chloride.

The osmotic pressure ($\Pi$) of a saline stream can be estimated as follows (Parekh, P. S., ed., "Reverse Osmosis Technology: Applications for High-Purity Water Production" (1988) (Marcel Dekker, Inc., NY) pp. 189-193):

$$\Pi = 1.19[T + 273.15] \Sigma M_i \quad (4)$$

where $\Pi$ is in psi, T is in °C., and $M_i$ is the molar concentration of individual ions (mol/L). However, I have modified Eq. (4) to account for the actual rejection of each individual ion by the NF membrane as follows:

$$\Pi = 1.19[T + 273.15] \Sigma R_{ai} M_i \quad (5)$$

The predicted values of $\Pi_m$ and $\Pi_P$ from Eq. (5) include the correction for $\sigma$ that represents $R_a$ in the absence of concentration polarization.

The osmotic pressure will increase on the feed side at the membrane surface, and thus will lead to a reduction in the permeate flow (throughput). This, in turn, will lead to an application of higher operating pressures to achieve a higher throughput. Table 3 presents the predicted values of $\Pi_m$ and $\Pi_P$. The $\Delta \Pi$ values in the first and second stages of NF are, respectively, 287 and 197 psi. Such values of $\Delta \Pi$ would require operating feed pressures ranging from 550 to 650 psi. The higher chloride concentration in seawater from the Arabian Gulf has led to increase the values of $\Delta \Pi$ by a factor of 1.75 (in the first-stage) and 1.5 (in the second-stage) compared, for instance, to the North Sea. It is worth mentioning that the structural pressure limit of a typical NF spiral wound membrane vessel is 600 psi.

Based on the analysis of sulfate scale tendency, a more effective way in using NF is to operate it at a 30 to 40% throughput ratio to produce a nearly sulfate-free permeate stream. The remaining 60 to 70% of the sulfate-concentrated NF stream will be treated by the CPP process as shown in FIG. 3.

The NF-CPP is similar to the RO-CPP except that the NF concentrate stream will be injected into the precipitator unit at its given pressure that ranges between about 400 and about 600 psi. The selected amine solvent will be injected into the precipitator unit at pressure ranges between 400 psi and its critical pressure. Once sulfate is depleted from the NF concentrate stream by the CPP process, then the NF nearly sulfate-free permeate stream will be combined with the sulfate-depleted NF concentrate stream by CPP for oil-fields water injection operations The following advantages can be achieved with the use of the NF-CPP process. First, NF membranes can be operated in an almost scale-free manner. This would substantially minimize operating costs (e.g., addition of scale inhibitors, frequent membranes cleanup, membranes replacement, and high power consumption due to high osmotic pressures).

Second, the sulfate-free mixed stream (NF permeate stream plus CPP treated NF concentrate stream) contains an almost equivalent amount of sodium chloride as untreated seawater. Therefore, it is to some degree more compatible with salinity of formation waters than the NF permeate stream alone that contains about 15% less sodium chloride than untreated seawater.

Third, the NF-CPP could provide a zero or a near zero discharge processing system by co-producing and using gypsum for different applications. The final concentrate stream from NF as a stand-alone process is at best 25% of the feed stream. However, this is not the case with seawater from the Arabian Gulf where the volume of the NF concentrate ranges between 60 and 70% of the feed stream. Such a large NF concentrate stream gives rise to a disposal problem of considerable magnitude, particularly, for onshore oil-fields operations.

The Integration of Membrane Distillation (MD) with the CPP Process

MD refers to the transport of the vapor phase through pores of a hydrophobic membrane that separates two liquid solutions. The liquid solution cannot enter the membrane pores unless the applied pressure is greater than the specified "liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the warm membrane interface (feed), vapor will transport through the membrane pores with a convective and/or diffusion mechanism, and condensation will take place at the cold membrane interface (permeate). Thus the net permeate vapor flux will be from the warm solution to the cold solution.

Several advantages of MD compared to conventional pressure-driven membranes or evaporation processes can be seen. First, MD can take place at a low pressure that ranges from sub-atmospheric to 40 psi. Contrary to NF and RO that ought to be operated at high pressures (500 to 1,200 psi) to exceed the natural osmotic pressure of seawater and to achieve the required throughput. Such high pressures require high power consumption.

Second, MD can be conducted at temperatures that are appreciably lower than the boiling point of water (45-65° C.). Any form of waste heat (e.g., existing low temperature gradients typically available in processing plants) or low grade energy sources (wind or solar or geothermal) can be used. A simple wind generator or a solar collector combined with a shell and tube heat exchange can be employed to operate MD.

Third, the distillate product from seawater that contains non-volatile ions is an ultra-pure. Thus, entrainment of dissolved ions in the permeate stream, as the case with NF or RO, is avoided. In application such as concentrating seawater for oil-fields water injection operations, ultra-pure water is the MD waste (discarded) stream, which is (if not used) an environmentally benign stream.

Fourth, the evaporation surface of MD can be made similar to the available various pressure-driven membrane modules (hollow fiber and spiral wound). Such a modularity of MD allows the addition of processing capacity as needed, flexibility and simplicity are not easily available with conventional evaporation processes.

In the design of MD for sulfate-free seawater, however, knowledge of temperature and concentration limits of both calcium sulfate (predominant scale) and sodium chloride (predominant salt) is critical. Calcium sulfate has three principle forms as a function of temperature. These forms are gypsum ($CaSO_4 2H_2O$), calcium sulfate hemihydrate ($CaSO_4 1/2H_2O$), and calcium sulfate anhydrite ($CaSO_4$). Gypsum forms at low temperatures (below 90° C.) whereas hemihydrate and anhydrite form at high temperatures (above 100° C.). The gypsum-anhydrite transition temperature is about 60° C. Gypsum is thus the main occurring calcium sulfate within the MD operating temperature range (45-65° C.).

As shown in FIG. 2, the maximum aqueous solubility limit of gypsum at atmospheric pressure in sodium chloride solution is about 3.5-fold higher than the solubility limit of gypsum in pure water. Such a limit occurs at sodium chloride concentrations ranging between about 125,000 and about 175,000 mg/L. Apparently, the aqueous solubility limits of gypsum in sodium chloride solution insignificantly vary with temperatures.

The aqueous solubility limits of sodium chloride are extremely high and temperature dependent (slightly increase with increasing temperatures). In the targeted MD temperature range (45-65° C.), the saturation limits of sodium chloride are about thirteen-fold the concentration of sodium chloride in seawater. As evaporation takes place, the viscosity of seawater will increase with the increase-of sodium-chloride concentrations. This could theoretically elevate osmotic pressures, depress vapor pressures, and alter heat and mass transfer across the MD membrane boundary layers.

The osmotic pressure of a saline stream can be estimated by Eq. (4). The vapor pressure of a saline stream can be related to the osmotic pressure as follows:

$$p^s = \frac{p^o}{\exp\left[\frac{\Pi \tilde{v}_w}{RT}\right]} \quad (6)$$

where $p^s$ is the vapor pressure of a saline stream (mmHg), $p^o$ is the vapor pressure of pure water (mmHg) at a given temperature that can accurately be estimated by the Antoine equation, $\tilde{v}_w$ is the water molar volume (L/gmol) at a given temperature, R is the ideal gas constant (L psi/gmol K), and T is the temperature (K).

If distilled (or fresh) water is used as the MD stripping (cold) stream at 25° C., then the vapor pressure of pure water at 25° C. is the limit, in which the vapor pressure of MD feed stream (seawater) must exceed. Using Eqs. (4) and (6), FIG. 5 shows the vapor pressure of pure water at 25° C. as well as the vapor pressures at different temperatures of typical seawater (salinity: 34,416 mg/L), seawater with a concentration factor of about 2 (70,000 mg/L), seawater with a concentration factor of about 3 (100,000 mg/L), seawater with a concentration factor of about 3.5 (120,000 mg/L), and seawater at the saturation limits of sodium chloride.

The MD permeate flux is proportional to the vapor pressure difference between the MD feed and permeate streams. Since the relation between the vapor pressure and temperature is exponential, it is expected that the relation between the MD flux and temperature is also exponential. As such, an increase or decrease in the MD flux depends on the temperature range of the feed rather than the temperature difference between the feed and permeate streams.

Figure 5:
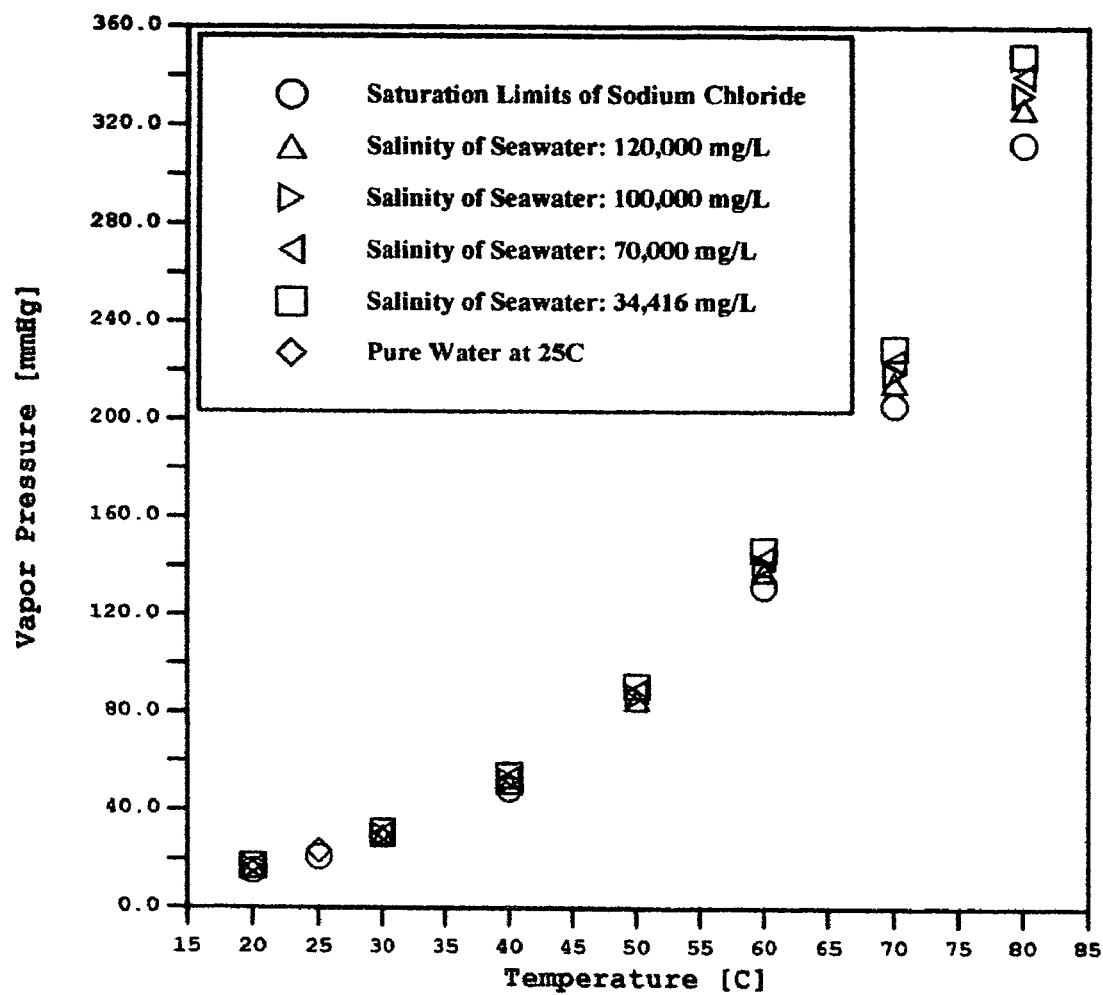
FIG. 5 illustrates a simple flow diagram for the MD-CPP process.

FIG. 5 indicates that MD permeate flux should not be affected by the presence of significant concentration of sodium chloride even at the saturation limit of sodium chloride. MD is thus clearly capable of concentrating seawater to the saturation limits of gypsum (concentration factor of 3.5) without affecting the driving force (higher vapor pressures in feed stream than in the permeate stream).

If MD is operated near saturation or at the saturation limit of gypsum, however, solution viscosity would increase and gypsum precipitates would possibly start nucleation at the membrane surface resulting in spontaneous wetting of the membrane. Further, increasing viscosity could increase boundary layer thickness, and thus could increase the overall resistance to heat and mass transfer at the membrane surface (temperature and concentration at the feed membrane surfaces could be different from their values at the bulk feed stream).

Therefore, MD must be operated below the saturation limit of gypsum to prevent: (1) decline in permeate flux; and (2) precipitates nucleation and build-up at the membrane surface and/or inside the membrane pores. If MD feed stream is conducted at 65° C., then seawater can be concentrated to a level between 1.5 and 2-fold. This would minimize the influence of solution viscosity and entirely eliminate membrane wettability on the feed side of MD. Once gypsum is concentrated by MD to a level not detrimental to effective operation, CPP can then be used to effectively precipitate gypsum for the production of concentrated sulfate-free seawater.

The CPP process to treat the MD concentrate stream can be implemented as shown in FIG. 3. However, the differences between the MD concentrate stream and a concentrate stream from pressure-driven membranes (RO and NF) are that the pressure of the MD concentrate stream is slightly above atmospheric pressure (between 400 and 1,150 psi for RO or NF), and the temperature of the MD concentrate stream is about 65° C. (about ambient temperature for RO or NF).

The relatively high temperature of the MD concentrate stream compared to RO or NF concentrate stream is advantageous in: (1) nearly completely recovering the amine solvent for reuse; and if used (2) minimizing the influence of the modifier such as $N_2$ or $N_2O$ (mixture ratio) on the desired properties of the amine solvent.

The disadvantage of the MD concentrate stream low pressure can be overcome by installing an energy recovery device between the precipitator unit and the stage of the hydrocyclones as shown in FIG. 3. However, the main difference between the RO-CPP as shown in FIG. 3 and the MD-CPP is that the recovered hydraulic energy will be used to pressurize the MD concentrate stream [10] (the larger stream) rather than the amine solvent [14] (the smaller stream) into the precipitator [16]. This would significantly minimize the operating cost of pumping the MD concentrate stream to the precipitator. As such, the MD concentrate stream can be injected into the precipitator unit [16] at a pressure between about 400 and about 600 psi.

With the exception of the pressurizing step for the MD concentrate stream and the recycling of the recovered energy, the rest of the processing steps of the MD-CPP are identical to the processing steps in the RO-CPP(NF-CPP) as shown in FIG. 3.

The Integration of Membrane Osmotic Distillation (MOD) with the CPP Process

Figure 6:
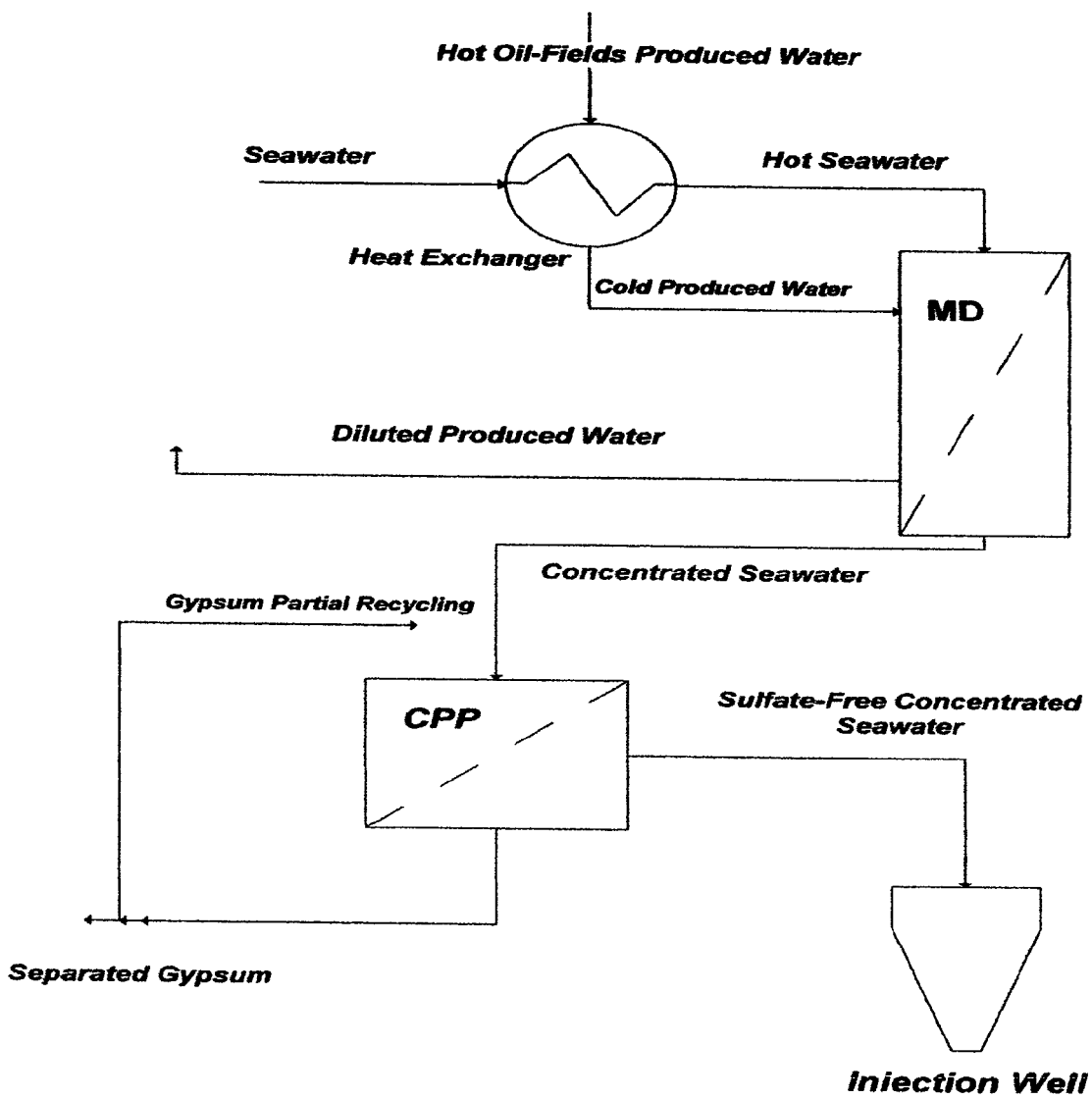
FIG. 6 illustrates vapor pressures of seawater at different concentration factors.

Osmosis is defined as the passage of the water vapor through the semipermeable hydrophobic membrane from a dilute stream into a concentrate stream. The excess waste energy in terms of osmotic pressure and temperature within most oil-fields produced waters (extreme salinity with temperatures about 80° C. or higher) can be exchanged with seawater (a much lower salinity stream at ambient temperature) as shown in FIG. 6 to operate MOD. This would improve the efficiency and minimize the operating cost of concentrating seawater by MOD.

Figure 7:
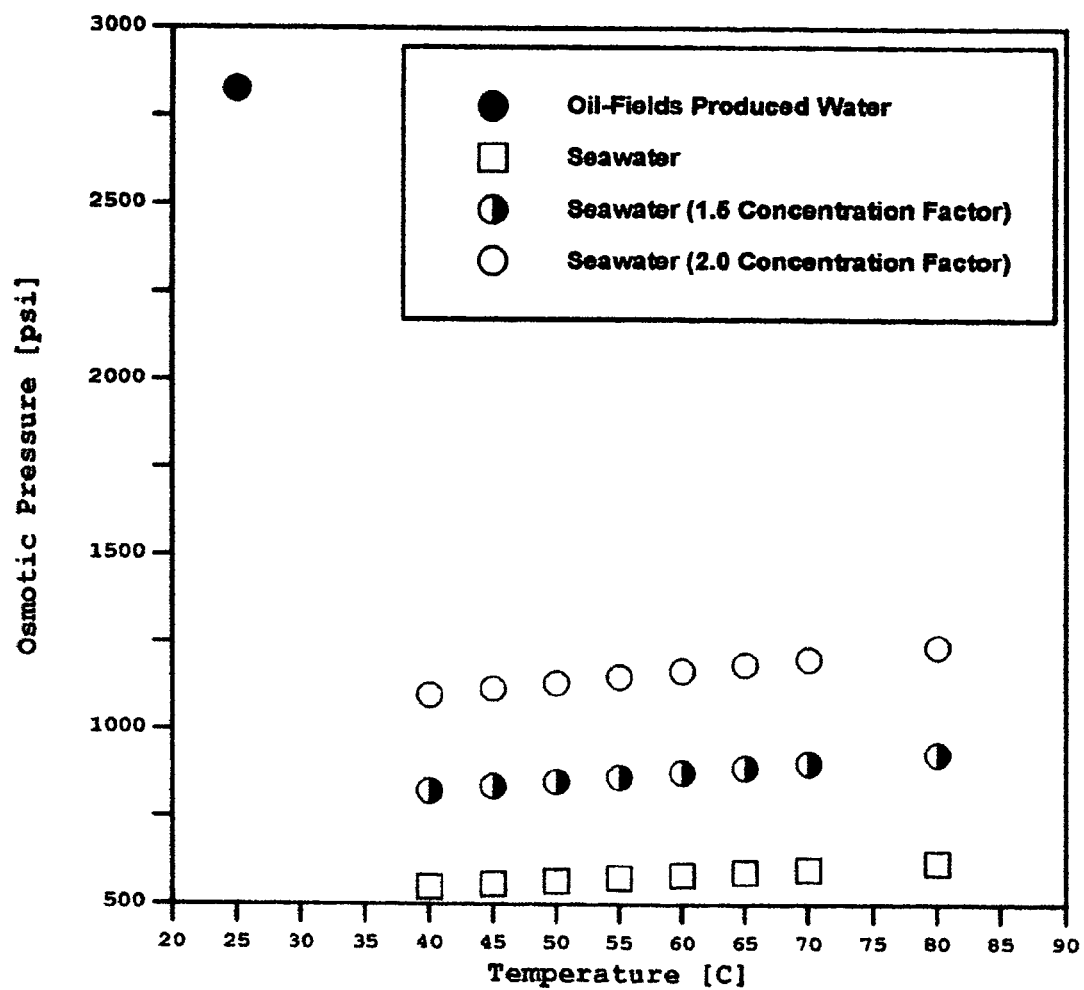
FIG. 7 illustrates the osmotic pressures of seawater vs. oil-fields produced water.

FIG. 7 shows that the osmotic pressure of produced water at 25° C. is significantly higher than the osmotic pressures of seawater at different concentration factors within the MOD operating temperatures range. Even at higher temperatures and concentration factors where the osmotic pressures of seawater increase (decrease in vapor pressures), the osmotic pressures differences between seawater and produced water remain substantial. If a highly saline hot oil-fields produced water is used, then the driving force in MOD will appreciably be enhanced due to differences in both temperature and osmotic pressure gradients between the feed stream (seawater) and the stripping stream (produced water).

Once the concentration of gypsum in the concentrated seawater reaches a level that is not detrimental to MOD operation, then the CPP process will be conducted (as shown in FIG. 3) to induce the precipitation of gypsum from the concentrated seawater. As the case with MD-CPP, the recovered hydraulic energy will be used to pressurize the MOD concentrate stream [10] (the larger stream) rather than the amine solvent [14] (the smaller stream) into the precipitator [16].

It should be pointed out that the spent produced water stream will be, to some degree, diluted with distilled water from the MOD permeate stream. This could be advantageous in mitigating the problem of disposing oil-fields produced water. However, oil contents in oil-fields produced water must be reduced, if not near completely removed, before using such water as a stripping stream in MOD to concentrate seawater.

The External Seeding CPP Process

The CPP process as a stand alone can also be implemented to directly treat seawater for the selective removal of sulfate. The process involves contacting seawater (without a concentration step such as RO or NF or MD) with a selected amine solvent in a precipitator unit, preferably at about the critical pressure of the amine solvent. Since seawater is undersaturated with gypsum, the amine solvent will initiate the nucleation of sulfate, and with the help of a seeding step, precipitate growth will be enhanced to form gypsum. The main purpose of seeding is to minimize the use of the amine solvent and/or to allow the injection of seawater at a moderate pressure rather than a very high pressure.

Figure 8:
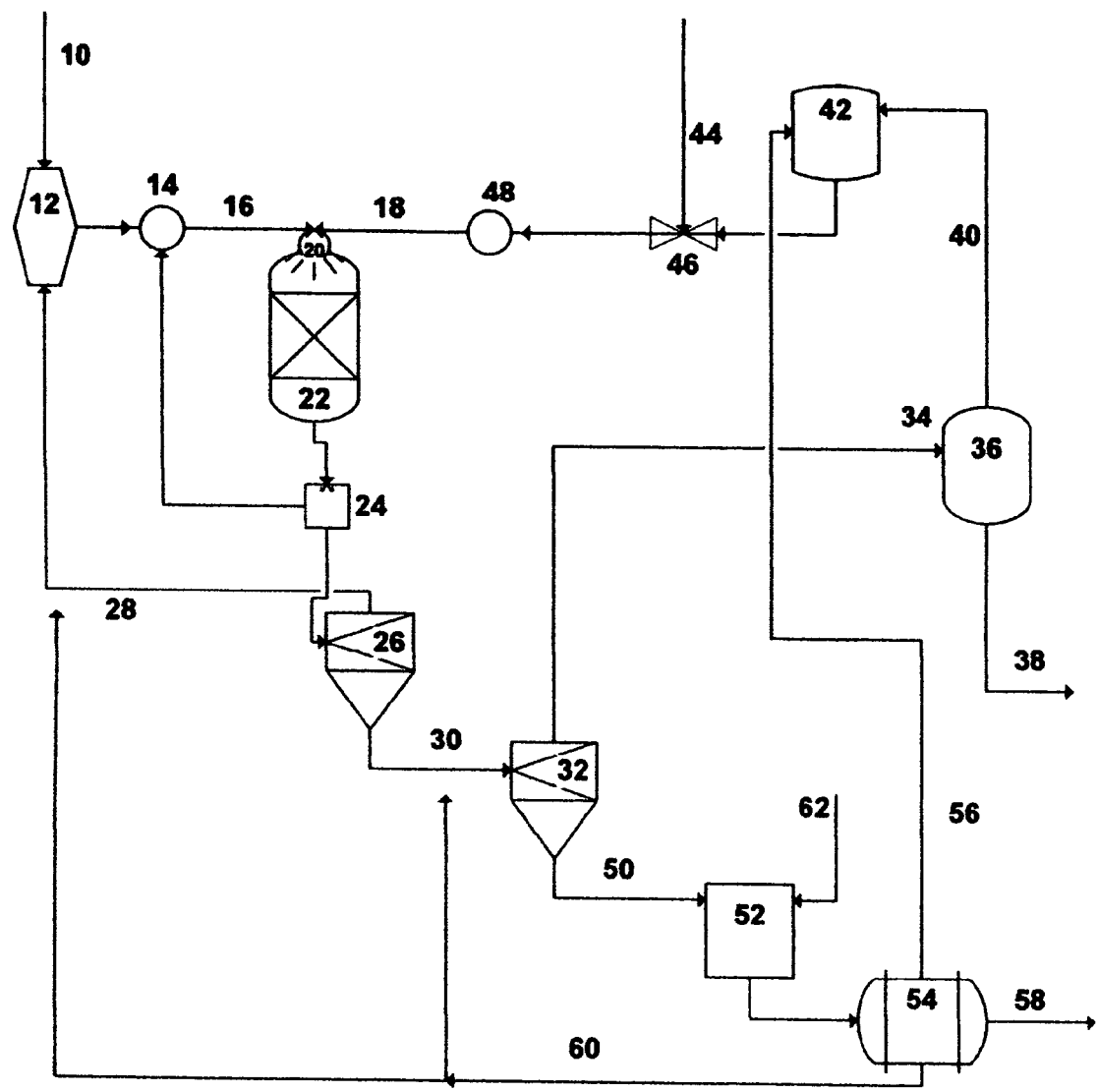
FIG. 8 illustrates a possible flow diagram for the external seeding CPP process.

An external seeding step can be accomplished by adding a stage of size-classification hydrocyclones as shown in FIG. 8. The over flow stream with very fine precipitates (preferably less than 10 microns) of such a stage of hydrocyclones will be recycled to a pre-precipitator unit, and the under flow stream with large precipitates will be forwarded to a thickener-stage of hydrocyclones to further thicken the gypsum precipitates. However, the reverse arrangement of the over and under flow streams for the size-classification stage of hydrocyclones is also feasible, depending on the desired size of gypsum precipitates.

As shown in FIG. 8, the seeding over flow stream [28] from the size-classification stage of hydrocyclones [26] can be mixed with the seawater feed stream [10] in a pre-precipitator unit [12] via two separate injection nozzles. The seeding over flow stream will collide with seawater in a pre-precipitator unit to allow an intense micromixing that enhances the concentration of gypsum before entering the main precipitator unit [22].

The gypsum-enhanced seawater stream [16] will be injected into the main precipitator unit preferably via the inner tube of at least one concentric nozzle [20]. The pressure of such a stream is between about 400 and about 600 psi. A selected amine solvent will be injected [18] into the main precipitator [22] at a pressure ranging between about 400 psi and its critical pressure through the coaxial annulus of the same concentric nozzle [20]. Multiple nozzles can also be used within the same precipitator unit.

A suitable energy recovery device [24] can be used to convert the hydraulic energy from the outlet stream of the main precipitator unit [22] into mechanical energy for reuse to boost the pressure of the gypsum-enhanced seawater feed stream [1,4]. It should be pointed out that this setup of the energy recovery is similar to the setup in the MD- or MOD-CPP processes. However, unlike the concentrate stream from RO (or NF) that inherits a significant hydraulic pressure from its feed stream, the seeding CPP process (as well as MD- or MOD-CPP processes) requires pressurizing seawater feed stream to the main precipitator unit. As such, the recovered hydraulic energy is diverted to the seawater feed stream (the larger stream) rather than the amine solvent (the smaller stream).

The under flow stream [30] from the size-classification stage of hydrocyclones [26] will be fed into a thickener-stage of hydrocyclones [32]. The processing steps [34-46] as shown in FIG. 8 for the over flow stream [34] from the thickener-stage of hydrocyclones [32] are similar to the RO-CPP processing steps [24-36] as given in FIG. 3.

The under flow stream [50] from the thickener-stage of hydrocyclones [32] will be fed into the final gypsum filter [54] via a thickener tank [52]. The processing steps [50-62] as shown in FIG. 8 for the under flow stream [50] from the thickener-stage of hydrocyclones [32] are similar to the RO-CPP processing steps [38-50] as given in FIG. 3.

It should be pointed out that if potassium sulfate is produced from gypsum as given in Eq. (2), then the recycled aqueous liquor stream [60] from the final potassium sulfate filter [54] that contains dissolved calcium chloride resulting from the reaction of gypsum with potassium chloride [62] would be ideal for enhancing calcium concentration in seawater feed stream [10] (FIG. 8). This would significantly increase the saturation degree of gypsum in seawater before entering the precipitator unit [22].

The Internal Seeding CPP Process

Figure 9:
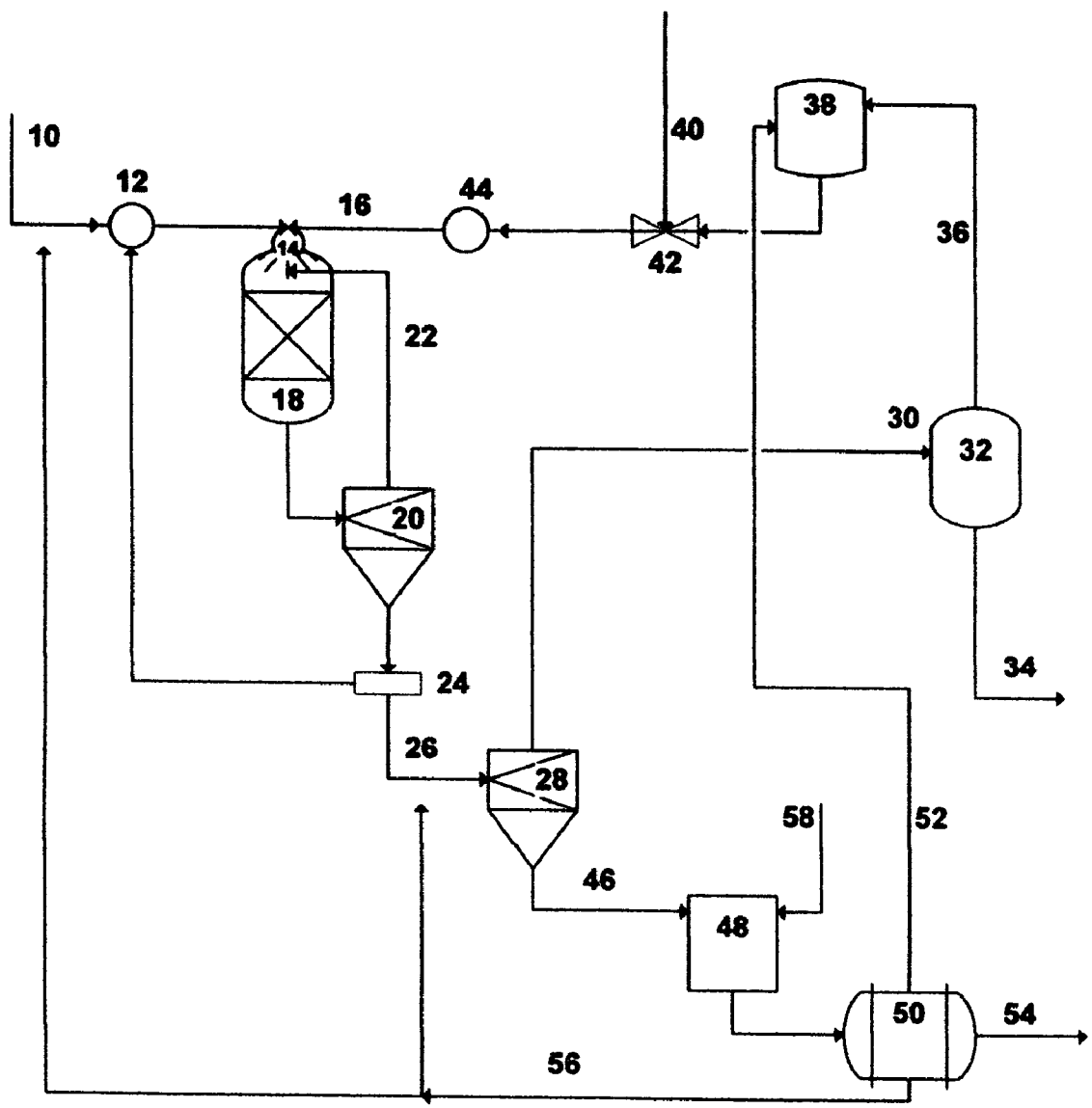
FIG. 9 illustrates a possible flow diagram for the internal seeding CPP process.

Alternatively, FIG. 9 shows that an internal seeding step can be done by recycling the over flow stream [22] from the size-classification stage of hydrocyclones [20] directly to the top of the precipitator unit [18] via a separate injection nozzle. The nozzle will preferably inject the recycled seeding stream to the center of the jet stream that originates from the main concentric nozzle [14] (original contact between seawater [10] and the amine solvent [16]) where the highest precipitate growth will take place. The precipitate growth is directly proportional to the concentration of the targeted species (gypsum). Therefore, the increase of the precipitate growth rate with higher concentration of gypsum will increase the gypsum precipitate size.

As shown in FIG. 9, the energy recovery device [24] is placed on the under flow stream [26] of the size-classification stage of hydrocyclones [20] to convert the hydraulic energy into mechanical energy for reuse to boost the pressure of seawater [10] into the precipitator unit [18]. This would allow recycling the over flow stream [22] from the size-classification stage of hydrocyclones [20] into the precipitator unit [18] at a pressure almost equivalents to the pressure of the precipitator unit.

Unlike the external seeding CPP process (FIG. 8), the internal seeding CPP process (FIG. 9) does not require a pre-precipitator unit. With the exception of the seeding mechanism and the location of the energy recovery device, the rest of the processing steps are identical in both processes. The processing steps [30-42] and [46-58] in the internal seeding CPP (FIG. 9) are, respectively, equivalent to [34-46] and [50-62] in the external seeding CPP (FIG. 8).

In both the external and internal seeding CPP processes, the seeding step accelerates the withdrawal of the very fine precipitates from the precipitator unit, and therefore it decreases the total precipitates surface area. Then, the recycled seeding stream increases the initial concentration of the targeted gypsum, and thus it is possible to achieve higher supersaturation. This would lead to increase the precipitation of larger particles and within the precipitator unit.

TABLE 1

Seawater and Samples of Oil-Fields Produced Waters (Arabian Gulf)

| | | | Zakum Field | | Ghawar Field | |
|---|---|---|---|---|---|---|
| Ion | SW | RO-SWCS | PW1 | PW2 | PW1 | PW2 |
| Cations | | | | | | |
| $Na^+$ | 14,161 | 20,090 | 68,195 | 83,692 | 29,608 | 51,187 |
| $K^+$ | 722 | 1,024 | 4,361 | 5,389 | NR | NR |
| $Mg^{+2}$ | 1,642 | 2,330 | 1,903 | 1,879 | 1,575 | 4,264 |
| $Ca^{+2}$ | 530 | 837 | 19,483 | 15,769 | 13,574 | 29,760 |
| $Sr^{+2}$ | 15 | 21 | 1,090 | 1,035 | 557 | 1,035 |
| $Ba^{+2}$ | NR | NR | 10 | 5 | 8 | 10 |
| Anions | | | | | | |
| $Cl^-$ | 25,491 | 36,164 | 147,910 | 167,604 | 73,861 | 143,285 |
| $HCO_3^-$ | 138 | 256 | 256 | 42 | 369 | 351 |
| $SO_4^{-2}$ | 3,594 | 5,099 | 287 | 663 | 404 | 108 |

SW: Seawater;
RO-SWCS: Reverse Osmosis Seawater Concentrate Stream (Throughout Ratio: 30% and 98% Ions Rejection);
PW: Oil-Fields Produced Water;
Concentrations (mg/L); NR: Not Reported.

TABLE 2

Properties of Selected Pure Fluids

| Fluid | $T_b$ K | $T_c$ K | $p_c$ atm (psi) | $V_c$ mL/mol | $\omega$ | DP (debye) |
|---|---|---|---|---|---|---|
| $N_2$ | 77.4 | 126.2 | 33.4 (490.8) | 89.9 | 0.039 | 0.0 |
| $N_2O$ | 184.7 | 309.6 | 71.5 (1050.8) | 97.4 | 0.165 | 0.2 |
| $CO_2$ | | 304.1 | 72.8 (1069.9) | 93.9 | 0.239 | 0.0 |
| $MA(CH_5N)$ | 266.8 | 430.0 | 74.3 (1091.9) | | 0.292 | 1.3 |
| $DMA (C_2H_7N)$ | 280.0 | 437.7 | 53.1 (780.4) | | 0.302 | 1.0 |
| $EA(C_2H_7N)$ | 289.7 | 456.4 | 55.7 (818.6) | 182.0 | 0.289 | 1.3 |
| $IPA(C_3H_9N)$ | 305.6 | 471.8 | 44.8 (658.4) | 221.0 | 0.291 | 1.2 |
| $PA(C_3H_9N)$ | 321.7 | 497.0 | 48.1 (706.9) | 233.0 | 0.303 | 1.3 |
| $DEA (C_4H_{11}N)$ | 328.6 | 496.5 | 37.1 (545.2) | 301.0 | 0.291 | 1.1 |
| $DIPA (C_6H_{15}N)$ | 357.1 | 523.1 | 30.2 (443.8) | | 0.360 | 1.0 |
| $DPA (C_6H_{15}N)$ | 382.5 | 555.8 | 29.9 (439.4) | | 0.471 | 1.0 |
| $H_2O$ | 373.2 | 647.3 | 218.3 (3208.1) | 57.1 | 0.344 | 1.8 |

$T_b$: Normal Boiling Point; $T_C$: Critical Temperature; $p_C$: Critical Pressure; $V_C$: Critical Volume; $\omega$: Pitzer's Acentric Factor; DP: Dipole Moment

TABLE 3

Analysis of Sulfate Scale and Osmotic Pressures for Dual-Stages NF (Arabian Gulf)

| Ion | $C_F$ (mg/L) | $R_a$(%) | $R_O$ (%) | $C_P$ (mg/L) | $C_C$ (mg/L) | $C_m$ (mg/L) |
|---|---|---|---|---|---|---|
| First-Stage NF at 50% Throughput Ratio | | | | | | |
| $Na^+$ | 14161 | 43.0 | 16.0 | 11895 | 16388 | 20869 |
| $K^+$ | 722 | 42.8 | 17.0 | 599 | 843 | 1048 |
| $Mg^{+2}$ | 1642 | 87.6 | 69.0 | 509 | 2756 | 4105 |
| $Ca^{+2}$ | 590 | 76.0 | 50.0 | 215 | 880 | 1229 |
| $Sr^{+2}$ | 15 | 82.1 | 58.0 | 6 | 24 | 35 |
| $Cl^-$ | 25491 | 46.2 | 17.0 | 21158 | 29749 | 39326 |
| $HCO_3^-$ | 138 | 78.4 | 47.0 | 73 | 201 | 339 |
| $SO_4^{-2}$ | 3594 | 99.7 | 98.0 | 72 | 7055 | 23960 |
| | $\Pi_p$: 188.2 psi | | | | $\Pi_m$: 475.0 psi | |
| Gypsum: | S: 0.74 | | | | S: 2.61 | |
| Celestite: | S: 1.19 | | | | S: 4.61 | |
| Second-Stage NF at 50% Throughput Ratio | | | | | | |
| $Na^+$ | 16388 | 27.8 | 9.5 | 14831 | 17945 | 20542 |
| $K^+$ | 843 | 27.5 | 9.8 | 760 | 925 | 1048 |
| $Mg^{+2}$ | 2756 | 78.3 | 56.3 | 1204 | 4307 | 5549 |
| $Ca^{+2}$ | 880 | 61.7 | 37.3 | 552 | 1208 | 1441 |
| $Sr^{+2}$ | 24 | 69.9 | 46.9 | 13 | 35 | 42 |
| $Cl^-$ | 29749 | 30.4 | 9.7 | 26863 | 32635 | 38597 |
| $HCO_3^-$ | 202 | 64.9 | 36.6 | 128 | 276 | 365 |
| $SO_4^{-2}$ | 7055 | 99.3 | 97.8 | 155 | 13955 | 22173 |
| | $\Pi_p$: 165.1 psi | | | | $\Pi_m$: 362.3 psi | |
| Gypsum: | S: 1.69 | | | | S: 2.77 | |
| Celestite: | S: 2.94 | | | | S: 4.95 | |

$R_a$: Actual Rejection; $R_O$: Observed Rejection; $C_F$: Feed Stream Concentration; $C_P$: Permeate Stream Concentration; $C_C$: Concentrate Stream Concentration; $C_m$: Concentration at the Membrane Surface.

What is claimed is:

1. A method for separating sulfate from saline water to produce nearly sulfate-free saline stream and gypsum, said method comprising the steps of:
   (a) removing sulfate from said saline water by
      (i) concentrating said saline water by membrane system to produce an intermediate concentrate comprising at least gypsum, said gypsum having an increased concentration in said intermediate concentrate;
      (ii) pressurizing said intermediate concentrate into a precipitator at pressure between about 400 psi and about 1,200 psi through at least one nozzle to produce a jet stream of said intermediate concentrate;

(iii) pressurizing amine solvent or amine solvent with modifier into said precipitator at pressure between about 400 psi and about the critical pressure of said amine solvent or said amine solvent with modifier through at least one nozzle to form micron-size precipitates comprising said gypsum from said intermediate concentrate;

(iv) removing said micron-size precipitates from said intermediate concentrate by filter to produce gypsum slurry;

(v) removing at least most of said amine solvent or said amine solvent with modifier from said intermediate concentrate by stripper to produce said nearly sulfate-free saline stream;

(b) injecting said nearly sulfate-free saline stream into subterranean formation for hydrocarbons recovery;

(c) producing gypsum boards or gypsum materials from said gypsum slurry by
  (i) separating said gypsum slurry into moist solid gypsum and liquor stream by filter;
  (ii) removing at least most of remaining said amine solvent or said amine solvent with modifier from said liquor stream by stripper;
  (iii) recycling said liquor stream to said intermediate concentrate;
  (iv) molding said moist solid gypsum to produce said gypsum boards or said gypsum materials;
  (v) allowing said gypsum boards or said gypsum materials to dry; or (d) producing potassium sulfate from said gypsum slurry by
  (i) adding potassium chloride to said gypsum slurry to produce intermediate liquor stream;
  (ii) adding said amine solvent or said amine solvent with modifier to said intermediate liquor stream to form precipitates comprising said potassium sulfate;
  (iii) removing said precipitates from said intermediate liquor stream by filter;
  (iv) removing at least most of said amine solvent or said amine solvent with modifier by stripper; and
  (v) recycling said intermediate liquor stream comprising at least dissolved calcium chloride to said intermediate concentrate.

2. The method of claim 1 wherein said saline water is seawater, natural brine water, oil-gas fields produced water, coal-bed produced water, mining operations produced water, flue gas desulphurization produced water, or a combination thereof.

3. The method of claim 1 wherein said membrane system is reverse osmosis, nanofiltration, membrane distillation, membrane osmotic distillation, or a combination thereof.

4. The method of claim 1 wherein said nozzle is coaxial nozzle, spray nozzle, vibrating nozzle, premixed nozzle, or a combination thereof.

5. The method of claim 1 wherein said amine solvent is selected from the group consisting of isopropylamine, propylamine, dipropylamine, diisopropylamine, ethylamine, diethylamine, methylamine, dimethylamine, or a combination thereof.

6. The method of claim 1 wherein said modifier is nitrogen, nitrous oxide, or a combination thereof.

7. The method of claim 1 wherein said modifier is mixed with said amine solvent in an amount to reduce the critical temperature of said amine solvent.

8. The method of claim 1 wherein said modifier is mixed with said amine solvent in said amount not to affect polarity, basicity, miscibility, and precipitating ability of said amine solvent in said saline water.

9. The method of claim 6 wherein said modifier is liquid or gas.

10. The method of claim 1 wherein said filter is hydrocyclone, microfiltration, vacuum filter, press filter, centrifugal filter, electrostatic filter, or a combination thereof.

11. The method of claim 1 wherein said stripper is flash tank, distillation column, vacuum distillation, vacuum membrane distillation, pervaporation, or a combination thereof.

12. A method for separating sulfate from saline water to produce nearly sulfate-free saline stream and gypsum, said method comprising the steps of:

(a) concentrating sulfate in said saline water by
  (i) pressurizing said saline water into a precipitator at pressure between about 400 psi and about 1,200 psi through at least one nozzle to produce a jet stream of said saline water;
  (ii) pressurizing amine solvent or amine solvent with modifier into said precipitator at pressure between about 400 psi and about the critical pressure of said amine solvent or said amine solvent with modifier through at least one nozzle to form at least some micron-size precipitates comprising said gypsum from said saline water;
  (iii) classifying said micron-size precipitates into fine micron-size precipitates and large micron-size precipitates by filter;
  (iv) recycling said fine micron-size precipitates into a pre-precipitator to mix with said saline water to produce intermediate saline water; said gypsum having an increased concentration in said intermediate saline water;

(b) removing sulfate from said intermediate saline water by
  (i) pressurizing said intermediate saline water into said precipitator at said pressure between about 400 psi and about 1,200 psi through at least one said nozzle to produce said jet stream of said intermediate saline water;
  (ii) pressurizing said amine solvent or said amine solvent with modifier into said precipitator at said pressure between about 400 psi and about said critical pressure of said amine solvent or said amine solvent with modifier through at least one said nozzle to form large micron-size precipitates comprising said gypsum from said intermediate saline water;
  (iii) removing said large micron-size precipitates from said intermediate saline water by filter to produce gypsum slurry;
  (iv) removing at least most of said amine solvent or said amine solvent with modifier from said intermediate saline water by stripper to produce said nearly sulfate-free saline stream;

(c) injecting said nearly sulfate-free saline stream into subterranean formation for hydrocarbons recovery;

(d) producing gypsum boards or gypsum materials from said gypsum slurry by
  (i) separating said gypsum slurry into moist solid gypsum and liquor stream by filter;
  (ii) removing at least most of remaining said amine solvent or said amine solvent with modifier from said liquor stream by stripper;
  (iii) recycling said liquor stream to said saline water;
  (iv) molding said moist solid gypsum to produce said gypsum boards or said gypsum materials;

(v) allowing said gypsum boards or said gypsum materials to dry; or (e) producing potassium sulfate from said gypsum slurry by
  (i) adding potassium chloride to said gypsum slurry to produce intermediate liquor stream;
  (ii) adding said amine solvent or said amine solvent with modifier to said intermediate liquor stream to form precipitates comprising said potassium sulfate;
  (iii) removing said precipitates from said intermediate liquor stream by filter;
  (iv) removing at least most of said amine solvent or said amine solvent with modifier by stripper; and
  (v) recycling said intermediate liquor stream comprising at least dissolved calcium chloride to said saline water.

13. The method of claim 12 wherein said saline water is seawater, natural brine water, oil-gas fields produced water, coal-bed produced water, mining operations produced water, flue gas desulphurization produced water, or a combination thereof.

14. The method of claim 12 wherein said nozzle is coaxial nozzle, spray nozzle, vibrating nozzle, premixed nozzle, or a combination thereof.

15. The method of claim 12 wherein said amine solvent is selected from the group consisting of isopropylamine, propylamine, dipropylamine, diisopropylamine, ethylamine, diethylamine, methylamine, dimethylamine, or a combination thereof.

16. The method of claim 12 wherein said modifier is nitrogen, nitrous oxide, or a combination thereof.

17. The method of claim 12 wherein said modifier is mixed with said amine solvent in an amount to reduce the critical temperature of said amine solvent.

18. The method of claim 12 wherein said modifier is mixed with said amine solvent in said amount not to affect polarity, basicity, miscibility, and precipitating ability of said amine solvent in said saline water.

19. The method of claim 16 wherein said modifier is liquid or gas.

20. The method of claim 12 wherein said filter is hydrocyclone, microfiltration, vacuum filter, press filter, centrifugal filter, electrostatic filter, or a combination thereof.

21. The method of claim 12 wherein said stripper is flash tank, distillation column, vacuum distillation, vacuum membrane distillation, pervaporation, or a combination thereof.

22. A method for separating sulfate from saline water to produce nearly sulfate-free saline stream and gypsum, said method comprising the steps of:

(a) removing sulfate from said saline water by
  (i) pressurizing said saline water into a precipitator at pressure between about 400 psi and about 1,200 psi through at least one nozzle to produce a jet stream from said saline water;
  (ii) pressurizing amine solvent or amine solvent with modifier into said precipitator at pressure between about 400 psi and about the critical pressure of said amine solvent or said amine solvent with modifier through at least one nozzle to form at least some micron-size precipitates comprising said gypsum from said saline water;
  (iii) classifying said micron-size precipitates into fine micron-size precipitates and large micron-size precipitates by filter;
  (iv) recycling said fine micron-size precipitates into said precipitator at pressure between about 400 psi and about 1,200 psi through at least one nozzle to produce large micron-size precipitates comprising said gypsum from said saline water;
  (v) removing said large micron-size precipitates from said saline water by filter to produce gypsum slurry;
  (vi) removing at least most of said amine solvent or said amine solvent with modifier from said saline water by stripper to produce said nearly sulfate-free saline stream;

(b) injecting said nearly sulfate-free saline stream into subterranean formation for hydrocarbons recovery;

(c) producing gypsum boards or gypsum materials from said gypsum slurry by
  (i) separating said gypsum slurry into moist solid gypsum and liquor stream by filter;
  (ii) removing at least most of remaining said amine solvent or said amine solvent with modifier from said liquor stream by stripper;
  (iii) recycling said liquor stream to said saline water;
  (iv) molding said moist solid gypsum to produce said gypsum boards or said gypsum materials;
  (v) allowing said gypsum boards or said gypsum materials to dry; or (d) producing potassium sulfate from said gypsum slurry by
  (i) adding potassium chloride to said gypsum slurry to produce intermediate liquor stream;
  (ii) adding said amine solvent or said amine solvent with modifier to said intermediate liquor stream to form precipitates comprising said potassium sulfate;
  (iii) removing said precipitates from said intermediate liquor stream by filter;
  (iv) removing at least most of said amine solvent or said amine solvent with modifier by stripper; and
  (v) recycling said intermediate liquor stream comprising at least dissolved calcium chloride to said saline water.

23. The method of claim 22 wherein said saline water is seawater, natural brine water, oil-gas fields produced water, coal-bed produced water, mining operations produced water, flue gas desulphurization produced water, or a combination thereof.

24. The method of claim 22 wherein said nozzle is coaxial nozzle, spray nozzle, vibrating nozzle, premixed nozzle, or a combination thereof.

25. The method of claim 22 wherein said amine solvent is selected from the group consisting of isopropylamine, propylamine, dipropylamine, diisopropylamine, ethylamine, diethylamine, methylamine, dimethylamine, or a combination thereof.

26. The method of claim 22 wherein said modifier is nitrogen, nitrous oxide, or a combination thereof.

27. The method of claim 22 wherein said modifier is mixed with said amine solvent in an amount to reduce the critical temperature of said amine solvent.

28. The method of claim 22 wherein said modifier is mixed with said amine solvent in said amount not to affect polarity, basicity, miscibility, and precipitating ability of said amine solvent in said saline water.

29. The method of claim 26 wherein said modifier is liquid or gas.

30. The method of claim 22 wherein said filter is hydrocyclone, microfiltration, vacuum filter, press filter, centrifugal filter, electrostatic filter, or a combination thereof.

31. The method of claim 22 wherein said stripper is flash tank, distillation column, vacuum distillation, vacuum membrane distillation, pervaporation, or a combination thereof.

\* \* \* \* \*